United States Patent
Awoniyi et al.

(10) Patent No.: US 9,155,037 B2
(45) Date of Patent: Oct. 6, 2015

(54) MOBILE ASSISTED DISPARATE RADIO ACCESS TECHNOLOGY INTERFACING

(75) Inventors: Olufunmilola O. Awoniyi, San Diego, CA (US); Samir Salib Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 462 days.

(21) Appl. No.: 13/368,121

(22) Filed: Feb. 7, 2012

(65) Prior Publication Data

US 2013/0203452 A1   Aug. 8, 2013

(51) Int. Cl.
 H04W 92/02 (2009.01)
 H04W 52/02 (2009.01)
 H04W 36/14 (2009.01)
 H04W 48/18 (2009.01)

(52) U.S. Cl.
 CPC .......... *H04W 52/0203* (2013.01); *H04W 36/14* (2013.01); *H04W 48/18* (2013.01)

(58) Field of Classification Search
 CPC ............ H04W 36/0088; H04W 36/14; H04W 36/0055
 See application file for complete search history.

(56) References Cited

U.S. PATENT DOCUMENTS

| | | | |
|---|---|---|---|
| 2006/0128371 A1* | 6/2006 | Dillon et al. | 455/423 |
| 2008/0014957 A1 | 1/2008 | Ore | |
| 2008/0170557 A1 | 7/2008 | Yin | |
| 2009/0042576 A1 | 2/2009 | Mukherjee et al. | |
| 2009/0093251 A1 | 4/2009 | Cai et al. | |
| 2009/0180447 A1* | 7/2009 | Kim et al. | 370/338 |
| 2009/0274086 A1* | 11/2009 | Petrovic et al. | 370/312 |
| 2010/0167719 A1* | 7/2010 | Sun et al. | 455/423 |
| 2010/0234039 A1* | 9/2010 | Kwon et al. | 455/452.2 |
| 2011/0237257 A1 | 9/2011 | Soliman et al. | |

FOREIGN PATENT DOCUMENTS

EP   2141947 A1   1/2010

OTHER PUBLICATIONS

3GPP TS 25.133 V10.2.0 (Jun. 2011), 3rd Generation Partnership Project; Technical Specification Group Radio Access Network; Requirements for support of radio resource management (FDD) (Release 10), pp. 1-261.

3rd Generation Partnership Project; "Technical Specification Group Radio Access Network; Evolved Universal Terrestrial Radio Access (E-UTRA); Requirements for support of radio resource management" 3GPP TS 36.133 V9.0.0 (Release 9), pp. 1-259 (May 2009).

(Continued)

*Primary Examiner* — Fanghwa Wang
(74) *Attorney, Agent, or Firm* — Linda G. Gunderson

(57) ABSTRACT

A method of providing signaling information for a wireless communication node includes: obtaining, at first user equipment (UE), first information associated with a first node of a first radio access technology (RAT) network that uses a first RAT, the first UE being configured for wireless telecommunication; and sending, in response to obtaining the first information, second information from the first UE to a second node of a second RAT network that uses a second RAT that is different from the first RAT.

36 Claims, 17 Drawing Sheets

(56) References Cited

OTHER PUBLICATIONS

3GPP: "3rd Generation Partnership Project; Technical Specification Group Radio Access Networks; Evolved Universal Terrestrial Radio Access (E-UTRA) ; Potential solutions for energy saving for E-UTRAN (Release 10)", 3GPP Draft; TR 36.927, 3rd Generation Partnership Project (3GPP), Mobile Competence Centre; 650, Route Des Lucioles; F-06921 Sophia-Anti Polis Cedex; France, No. V1.0.0, Nov. 2010, pp. 1-19.

Huawei: "Overview to LTE energy saving solutions to cell switch off/on", 3GPP Draft; R3-100162, 3rd Generation Partnership Project (3GPP), Mobile Competence Centre ; 650, Route Des Lucioles ; F-06921 Sophia-Antipolis Cedex ; France, vol. RAN WG3, No. Valencia, Spain; 20100118, Jan. 15, 2010, XP050424028, [retrieved on Jan. 15, 2010].

International Search Report and Written Opinion—PCT/US2013/022235—ISA/EPO—May 29, 2013.

\* cited by examiner

MOBILE ASSISTED DISPARATE RADIO ACCESS TECHNOLOGY INTERFACING

BACKGROUND

Energy consumption in telecommunications networks is a significant expense. Energy is spent on numerous activities including a mobile device moving from a different network system, layer, or node for communication. For example, when mobile devices move from one radio access technology (RAT) network to another, there is significant latency and processing involved in the synchronization process due to the mobile devices' measurements and identification of the new networks. Further, much energy is expended by mobile devices working to initiate communication with the new networks and to obtain information once communication is established. Further still, energy may be wasted by trying to establish communication with a network node that is not ready to establish communication with a mobile device, e.g., network nodes in a power safe mode Further, significant delays are typically incurred during call hand-off between network nodes in different RATs leading possibly to dropped calls and significant performance penalties. These delays are mostly due to both the routing delay incurred as the call traverses multiple network entities in the RATs and the synchronization delays at the mobile device.

Further, communication between network nodes is often desirable, but not necessarily possible. For example, it may be desirable to communicate messages with another node to have the node turn on or off. Communication mechanisms between network nodes for these purposes may not exist or may not be standardized. For example, for communication of network energy messages between nodes of different radio access technologies, messages may be assumed to be easily carried using the Resource Information Management (RIM) based signaling, but this may not be true since RIM is optional in the 3GPP standard and may not be implemented by every carrier network.

SUMMARY

An example of a method of providing information for a wireless communication node includes: obtaining, at first user equipment (UE), first information associated with a first node of a first radio access technology (RAT) network that uses a first RAT, the first UE being configured for wireless telecommunication; and sending, in response to obtaining the first information, second information from the first UE to a second node of a second RAT network that uses a second RAT that is different from the first RAT.

Implementations of such a method may include one or more of the following features. The obtaining includes the UE receiving the first information from the first node using a first RAT and the sending includes the UE sending the second information to the second node using the second RAT. Obtaining the first information includes receiving a power status change request for the second node. Obtaining the first information includes receiving the first node's power status notification to be communicated to the second node. Obtaining the first information includes the UE measuring the first information. The second information is the first information. Obtaining the first information includes at least one of taking a measurement with the first node or taking a measurement with the second node. The second information includes at least one of a power status change request for the second node, a power status notification of the first node for the second node, or synchronization information. The second information is signaling information configured to be used by a second UE to connect to the first node. The signaling information comprises at least one of an indication of a discontinuous transmission schedule of the first node, an indication of a discontinuous reception schedule of the first node, a cell identifier, timing and frequency offset information between the first and second nodes, a scrambling code, an indication of a number of antennas used by the first node, or transmission bandwidth used by the first node. The first information includes at least one of a power status change request for the second node, a power status notification of the first node for the second node, synchronization information, an indication of an undesirable signal quality between the first UE and the first node, or an indication of an undesirable service ability of the first node.

Also or alternatively, implementations of the method may include one or more of the following features. The method further includes receiving a request at the first UE from the second node to obtain the signaling information as the first information, the request using the second RAT, where the first UE obtains the first information in response to the request. The method further includes identifying the first UE as able to obtain the signaling information while satisfying at least one criterion. The identifying includes determining that a quality of service for the first UE will be maintained while obtaining the signaling information. The identifying includes determining that a battery life of the first UE is sufficiently high to support obtaining the signaling information and sending the signaling information to the second node. The identifying includes determining that the battery life of the first UE is sufficiently high to support obtaining the signaling information and sending the signaling information to the second node without the battery life dropping below a threshold battery life level. The identifying includes determining that the first UE is currently capable of communicating with the first node and the second node. Obtaining the first information at the first UE includes obtaining a System Information Block (SIB) broadcast by the first node. Obtaining the first information at the first UE includes receiving a dedicated message from the first node.

Also or alternatively, implementations of the method may include one or more of the following features. The method further includes sending the second information from the second node to a second UE using the second RAT. Sending the second information from the second node to the second UE includes broadcasting the second information from the second node using the second RAT. Sending the second information from the second node to the second UE includes sending the second information in dedicated messages to a plurality of second UEs from the second node using the second RAT.

Also or alternatively, implementations of the method may include one or more of the following features. The method further includes: obtaining discontinuous transmission (DTX) mode schedule information, at the second node, for the first node; and aligning compressed mode gaps of transmissions from the second node toward the first UE with DTX mode transmission times of the first node. The method further includes sending an instruction from the second node to the first UE for the first UE to determine the first information during at least one of the DTX mode transmission times.

An example of a user equipment (UE) includes: means for wireless communication; means for obtaining first information associated with a first node of a first radio access technology (RAT) network that uses a first RAT; and means for sending, in response to obtaining the first information, second information to a second node of a second RAT network that uses a second RAT that is different from the first RAT.

Implementations of such a UE may include one or more of the following features. The means for obtaining includes means for receiving the first information from the first node using a first RAT and the means for sending includes means for sending the second information to the second node using the second RAT. The means for obtaining the first information includes at least one of means for receiving a power status change request for the second node or means for receiving a power status notification of the first node. The means for obtaining includes means for measuring the first information. The second information is signaling information configured to be used by another UE to connect to the first node. The signaling information includes at least one of an indication of a discontinuous transmission schedule of the first node, an indication of a discontinuous reception schedule of the first node, a cell identifier, frequency offset information between the first and second nodes, a scrambling code, an indication of a number of antennas used by the first node, or transmission bandwidth used by the first node. The second information includes at least one of a power status change request for the second node, a power status notification of the first node for the second node, or synchronization information. The first information includes at least one of a power status change request for the second node, a power status notification of the first node for the second node, synchronization information, an indication of an undesirable signal quality between the UE and the first node, or an indication of an undesirable service ability of the first node. The UE further includes means for receiving a request from the second node to obtain the signaling information as the first information, the request using the second RAT, where the means for obtaining are configured to obtain the first information in response to the request. The means for obtaining the first information are configured to obtain a System Information Block (SIB) broadcast by the first node.

Another example of a user equipment (UE) includes: a wireless communication module including receivers, transmitters, and antennas; a memory storing processor-readable instructions; and a processor coupled to the wireless communication module and the memory and configured to execute the instructions to: obtain first information associated with a first node of a first radio access technology (RAT) network that uses a first RAT; and send second information, corresponding to the first information, to a second node of a second RAT network that uses a second RAT that is different from the first RAT.

Implementations of such a UE may include one or more of the following features. The wireless communication module is configured to receive the first information from the first node using a first RAT and to send the second information to the second node using the second RAT. The processor is configured to obtain the first information by obtaining a power status change request for the second node or obtaining a power status notification of the first node. The second information is signaling information configured to be used by another UE to connect to the first node. The signaling information includes at least one of an indication of a discontinuous transmission schedule of the first node, an indication of a discontinuous reception schedule of the first node, a cell identifier, frequency offset information between the first and second nodes, a scrambling code, an indication of a number of antennas used by the first node, or transmission bandwidth used by the first node. The second information includes at least one of a power status change request for the second node, a power status notification of the first node for the second node, or synchronization information. The first information includes at least one of a power status change request for the second node, a power status notification of the first node for the second node, synchronization information, an indication of an undesirable signal quality between the UE and the first node, or an indication of an undesirable service ability of the first node. The processor is further configured to execute the instructions to receive a request, via the wireless communication module, from the second node to obtain the signaling information as the first information, the request using the second RAT, wherein the processor is configured to obtain the first information in response to the request.

An example of a computer program product residing on a processor-readable medium of user equipment (UE) includes instructions for causing a processor to: obtain first information associated with a first node of a first radio access technology (RAT) network that uses a first RAT; and send second information, corresponding to the first information, to a second node of a second RAT network that uses a second RAT that is different from the first RAT. The computer program product of claim 43 wherein the instructions are configured to cause the processor to receive the first information from the first node using a first RAT and to send the second information to the second node using the second RAT.

Implementations of such a computer program product may include one or more of the following features. The instructions are configured to cause the processor to obtain the first information by obtaining a power status change request for the second node or obtaining a power status notification of the first node. The second information is signaling information configured to be used by another UE to connect to the first node. The signaling information includes at least one of an indication of a discontinuous transmission schedule of the first node, an indication of a discontinuous reception schedule of the first node, a cell identifier, frequency offset information between the first and second nodes, a scrambling code, an indication of a number of antennas used by the first node, or transmission bandwidth used by the first node. The second information includes at least one of a power status change request for the second node, a power status notification of the first node for the second node, or synchronization information. The first information includes at least one of a power status change request for the second node, a power status notification of the first node for the second node, synchronization information, an indication of an undesirable signal quality between the UE and the first node, or an indication of an undesirable service ability of the first node. The instructions are configured to cause the processor to: receive a request from the second node to obtain the signaling information as the first information, the request using the second RAT; and obtain the first information in response to the request.

An example of a wireless communication node includes: means for sending a request using a first radio access technology (RAT) to a first UE for the first UE to obtain signaling information for another wireless communication node using a second RAT; means for identifying the first UE as able to obtain the signaling information for the another wireless communication node while satisfying at least one criterion; means for receiving the signaling information from the first UE using the first RAT; and means for sending the signaling information to a second UE using the first RAT.

Implementations of such a node may include one or more of the following features. The means for identifying are configured to determine that a quality of service for the first UE will be maintained while obtaining the signaling information. The means for identifying are configured to determine that a battery life of the first UE is sufficiently high to support obtaining the signaling information and sending the signaling information to the wireless communication node. The means for identifying are configured to determine that the battery life of the first UE is sufficiently high to support obtaining the signaling information and sending the signaling information to the wireless communication node without the battery life dropping below a threshold battery life level. The means for identifying are configured to determine that the first UE is currently capable of communicating with the wireless communication node and the another wireless communication node. The system further includes: means for obtaining discontinuous transmission (DTX) mode schedule information for the another wireless communication node; and means for aligning compressed mode gaps of transmissions from the wireless communication node toward the first UE with DTX mode transmission times of the wireless communication node. The system further includes means for sending an instruction to the first UE for the first UE to determine the signaling information during at least one of the DTX mode transmission times.

Another example of a wireless communication node includes: a wireless communication module including a receiver, a transmitter, and antennas; a memory storing processor-readable instructions; and a processor coupled to the wireless communication module and the memory and configured to execute the instructions to: send a request via the wireless communication module using a first radio access technology (RAT) to a first UE for the first UE to obtain signaling information for another wireless communication node using a second RAT; identify the first UE as able to obtain the signaling information for the another wireless communication node while satisfying at least one criterion; receive the signaling information from the first UE using the first RAT; and send the signaling information to a second UE using the first RAT.

Implementations of such a node may include one or more of the following features. The processor is configured to identify the first UE by determining that a quality of service for the first UE will be maintained while obtaining the signaling information. The processor is configured to identify the first UE by determining that a battery life of the first UE is sufficiently high to support obtaining the signaling information and sending the signaling information to the wireless communication node. The processor is configured to identify the first UE by determining that the battery life of the first UE is sufficiently high to support obtaining the signaling information and sending the signaling information to the wireless communication node without the battery life dropping below a threshold battery life level. The processor is configured to identify the first UE by determining that the first UE is currently capable of communicating with the wireless communication node and the another wireless communication node. The processor is further configured to execute the instructions to: obtain discontinuous transmission (DTX) mode schedule information for the another wireless communication node; and align compressed mode gaps of transmissions from the wireless communication node toward the first UE with DTX mode transmission times of the another wireless communication node. The processor is further configured to execute the instructions to send an instruction to the first UE, via the wireless communication module, for the first UE to determine the signaling information during at least one of the DTX mode transmission times.

An example of a computer program product residing on a processor-readable medium of a wireless communication node includes instructions for causing a processor to: send a request via a wireless communication module using a first radio access technology (RAT) to a first UE for the first UE to obtain signaling information for another wireless communication node using a second RAT; identify the first UE as able to obtain the signaling information for the another wireless communication node while satisfying at least one criterion; receive the signaling information from the first UE via the wireless communication module using the first RAT; and send the signaling information via the wireless communication module to a second UE using the first RAT.

Implementations of such a computer program product may include one or more of the following features. The instructions are configured to cause the processor to identify the first UE by determining that a quality of service for the first UE will be maintained while obtaining the signaling information. The instructions are configured to cause the processor to identify the first UE by determining that a battery life of the first UE is sufficiently high to support obtaining the signaling information and sending the signaling information to the wireless communication node. The instructions are configured to cause the processor to identify the first UE by determining that the battery life of the first UE is sufficiently high to support obtaining the signaling information and sending the signaling information to the wireless communication node without the battery life dropping below a threshold battery life level. The instructions are configured to cause the processor to identify the first UE by determining that the first UE is currently capable of communicating with the wireless communication node and the another wireless communication node. The instructions are further configured to cause the processor to: obtain discontinuous transmission (DTX) mode schedule information for the another wireless communication node; and align compressed mode gaps of transmissions from the wireless communication node toward the first UE with DTX mode transmission times of the another wireless communication node. The instructions are further configured to cause the processor to send an instruction to the first UE, via the wireless communication module, for the first UE to determine the signaling information during at least one of the DTX mode transmission times.

Techniques to reduce network acquisition and synchronization latency in a user equipment (UE) are provided. Energy may be efficiently used and/or conserved in an inter-RAT network while providing services. UEs can act as relays or initiators of signaling information between network nodes of different network layers, different networks, permitting information transfer in the absence of, or without using, backhaul connections. Redundant energy consumption for establishing or obtaining network connection information may be reduced or eliminated, e.g., by limiting the consumption to a single entity.

BRIEF DESCRIPTION OF THE DRAWINGS

FIG. 15 is a block, swim-lane flow diagram of a process of an underlay-idle-mode UE initiating overlay cell turn ON.

FIG. 18 is a block, swim-lane flow diagram of a process of an underlay-connected-mode UE initiating overlay cell turn ON.

DETAILED DESCRIPTION

Figure 1:
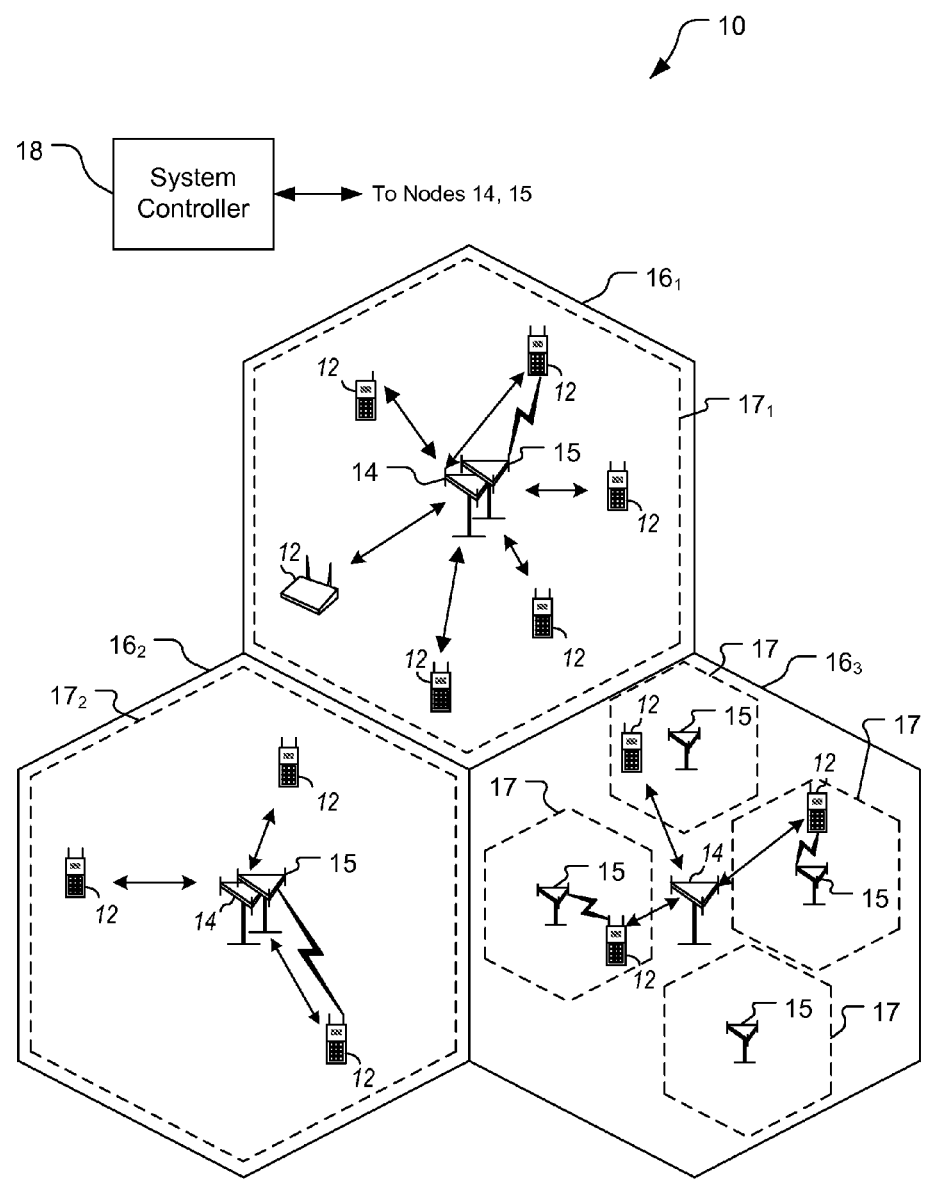
FIG. 1 is a schematic diagram of a wireless telecommunication system.

Techniques are provided for using a mobile device as an interface between communication systems, layers, or nodes. For example, a user equipment (UE) can be used to transfer signaling information between different radio access technology (RAT) networks, i.e., different layers of a telecommunication system, with different systems operated by different entities. The signaling information is information that can be used to coordinate between nodes, layers, networks, etc. and may include aiding and/or interfacing information and/or commands such as power-on or power-off commands. The UE can act as a relay of information, being requested by one node to transfer information to another node, or as an initiator of information transfer by determining to provide signaling information to a node.

For example, techniques may be used in inter-RAT scenarios (e.g., before or during reselection or handoff between cells supporting different radio access technologies or air interface standards). As one example, when a UE reselects or is handed off from an underlay 3G cell (e.g., a Universal Terrestrial Radio Access Network (UTRAN)) or a 2G cell (e.g. a GSM/EDGE Radio Access Network (GERAN) cell) to an overlay 4G cell (e.g., an Evolved Universal Terrestrial Radio Access Network (E-UTRAN) or LTE cell), there is significant latency and processing involved in the network acquisition and synchronization process due to measurements needed to acquire the new network. This latency is even more pronounced when the overlay cell is in an idle or powered down state (e.g., in a transmitter off time of a discontinuous transmission (DTX) state) because the UE waits until the overlay cell returns to an active state in order to take measurements of the overlay cell. These measurements may include aiding and synchronization information such as timing and frequency information, CELL identity (CELL_ID), discontinuous reception (DRX) schedule or cycle information, DTX schedule or cycle information, window position and timing sample measurements, orthogonal frequency division multiplexing (OFDM) symbol timing and frame timing obtained during scrambling code acquisition and tracking, and other synchronization measurements of the overlay cell that may facilitate a UE in underlay cell joining, reselecting, or being handed off to, the overlay cell. For example, a designated UE may measure a timing and frequency offset between the two networks using conventional scrambling code acquisition and tracking and report back to the underlay cell, which provides the information to other UEs on the underlay cell to assist them in acquiring the overlay cell. For energy saving purposes, an overlay cell may be powered down or DTXed when not needed (or when the load or demand is low). In a DTX mode, there are alternating DTX mode transmission times (intervals) when data are sent and down times (intervals) when the node is not transmitting data. During the down times, UEs may be moved (e.g., handed off) to the underlay cell and when the demand on the underlay cell increases, UEs in the underlay cell might attempt to acquire the overlay cell. Reacquiring the overlay cell requires expending energy.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.16 (WiMAX), IEEE 802.20, Flash-OFDM®, etc. UTRA is part of Universal Mobile Telecommunication System (UMTS). 3GPP Long Term Evolution (LTE) and LTE-Advanced (LTE-A) use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configurations set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various operations may be added, omitted, or combined. Also, features described with respect to certain examples may be combined in other examples.

Referring to FIG. 1, a wireless communication system 10 includes mobile user equipment 12 (UEs), and radio access communication nodes, here Node Bs, 14, 15 disposed in cells 16, 17. The system 10 may support operation on multiple carriers (waveform signals of different frequencies). The system 10 is a communication system in that the system 10 can at least send or receive communications although it need not be, but preferably is, able to send and receive communications. Multi-carrier transmitters can transmit modulated signals simultaneously on the multiple carriers. Each modulated signal may be a CDMA signal, a TDMA signal, an OFDMA signal, a SC-FDMA signal, etc. Each modulated signal may be sent on a different carrier and may carry pilot, overhead information, data, etc. The system 10 may be a multi-carrier network capable of efficiently allocating network resources. The system 10 is configured to provide services through the nodes 14, 15 to the UEs 12 and to turn on/off capabilities of the nodes 15 and to communicate between the UEs and the nodes 14, 15 to assist communication in the system 10. A radio network controller or system controller 18 is connected to the nodes 14, 15 for bi-directional communication, e.g., through backhaul wired connections. As discussed further below, the nodes 15 can be turned on or off based on capacity, desire for services, etc. Further, whether a particular node 15 turns on or off is preferably determined by the controller 18. Information upon which this determination is wholly or partially made is communicated between the nodes 14, 15 by the UEs 12.

The nodes 14, 15 can wirelessly communicate with the terminals 12 via antennas. Each of the nodes 14, 15 may be, and/or may be referred to as, a base transceiver station (BTS), an access point (AP), an access node (AN), an evolved Node B (eNB), etc. The nodes 14, 15 are configured to communicate with the UEs 12 under the control of a system controller 18 via multiple carriers. Note that when nodes 14, 15 are evolved Node Bs (eNBs), the nodes 14, 15 are typically combined with the controller 18 in one physical network entity. Each of the nodes 14, 15 can provide communication coverage for a respective geographic area, here the respective cells 16, 17. Each of the cells 16, 17 of the nodes 14, 15 is partitioned into multiple sectors as a function of the node antennas.

The nodes 14, 15 implement different technologies, with the nodes 14 being underlay nodes of an underlay radio access technology (RAT) and the nodes 15 being overlay nodes of an overlay RAT (with RAT being used herein as shorthand for a RAT network). For example, the discussion below assumes that the underlay RAT is a UTRAN/GERAN (3G/2G) network while the overlay RAT is an E-UTRAN/LTE (4G) network, but other types of networks could be used and/or their roles reversed. The overlay RAT may be used to provide additional capacity to the coverage area while the underlay RAT provides signal coverage. The overlay RAT may be used to provide supplemental services relative to the underlay RAT, e.g., with the overlay RAT providing different types of services and/or different characteristics for the same services, e.g., faster communication rates. Typically, each RAT will have its own radio network controller 18.

The system 10 may include only macro nodes 14, 15 or it can have nodes 14 of different types, e.g., macro, pico, and/or femto nodes. A node may cover a relatively large geographic area (e.g., several kilometers in radius) and may allow unrestricted access by terminals with service subscription. A pico node may cover a relatively small geographic area (e.g., a pico cell) and may allow unrestricted access by terminals with service subscription. A femto or home node may cover a relatively small geographic area (e.g., a femto cell) and may allow restricted access by terminals having association with the femto cell (e.g., terminals for users in a home).

As shown, different cells 17 of the overlay RAT implemented with the nodes 15 cover different areas relative to the cells 16 of the underlay RAT implemented with the nodes 14. The overlay cells $17_1$, $17_2$ have similar coverages as the underlay cells $16_1$, $16_2$ while the overlay cells 17 in the underlay cell $16_3$ are significantly smaller than the cell $16_3$.

The UEs 12 can be dispersed throughout the cells 16, 17. The UEs 12 may be referred to as mobile stations, mobile devices, access terminals (AT), or subscriber units. The UEs 12 here include cellular phones and a wireless router, but can also include personal digital assistants (PDAs), other handheld devices, netbooks, notebook computers, etc.

Figure 2:
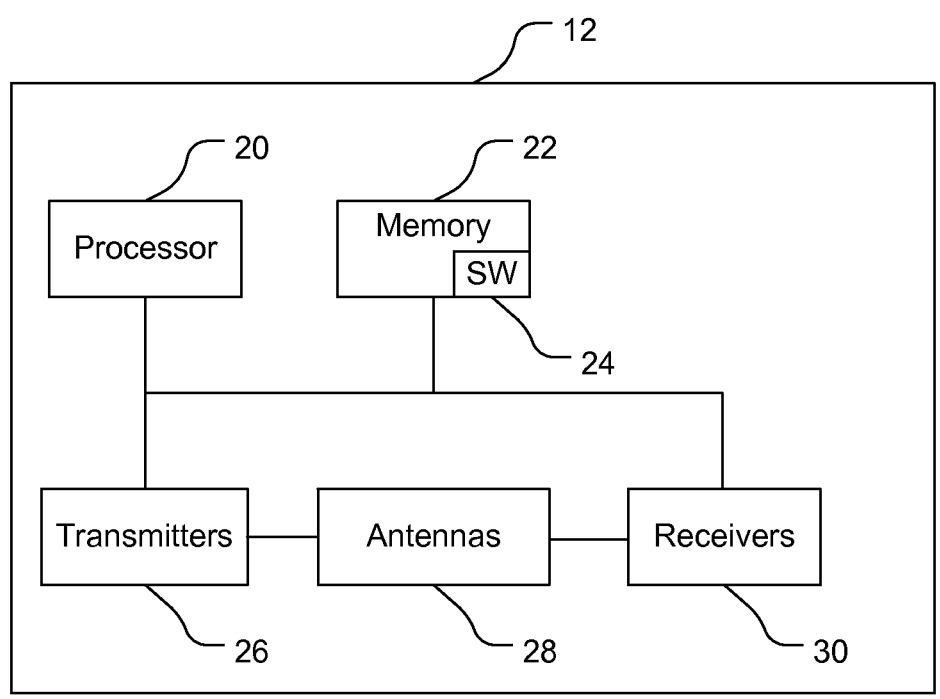
FIG. 2 is a block diagram of components of a mobile station shown in FIG. 1.

Referring also to FIG. 2, an example one of the UEs 12 comprises a computer system including a processor 20, memory 22 including software 24, transmitters 26, antennas 28, and receivers 30. The transmitters 26, antennas 28, and receivers 30 form a wireless communication module. The discussion below assumes that there are multiple antennas 28, one transmitter 26, and one receiver 30 dedicated for each of the RATs (e.g., multiple antennas 28, one transmitter 26, and one receiver 30 for communicating with the nodes 14 and multiple antennas 28, one transmitter 26, and one receiver 30 for communicating with the nodes 15), but this is not required, and implementations may be used, e.g., that have only one transmitter 26 and/or only one receiver 30, e.g., with only one physical entity capable of implementing its role (receiver, transmitter) for communication with multiple RATs. The transmitters 26 and receivers 30 are configured to communicate bi-directionally with the nodes 14, 15 via the antennas 28. The processor 20 is preferably an intelligent hardware device, e.g., a central processing unit (CPU) such as those made by ARM®, Intel® Corporation, or AMD®, a microcontroller, an application specific integrated circuit (ASIC), etc. The processor 20 could comprise multiple separate physical entities that can be distributed in the UE 12. The memory 22 includes random access memory (RAM) and read-only memory (ROM). The memory 22 stores the software 24 which is computer-readable, computer-executable software code containing instructions that are configured to, when executed, cause the processor 20 to perform various functions described herein. Alternatively, the software 24 may not be directly executable by the processor 20 but configured to cause the computer, e.g., when compiled and executed, to perform the functions.

Figure 3:
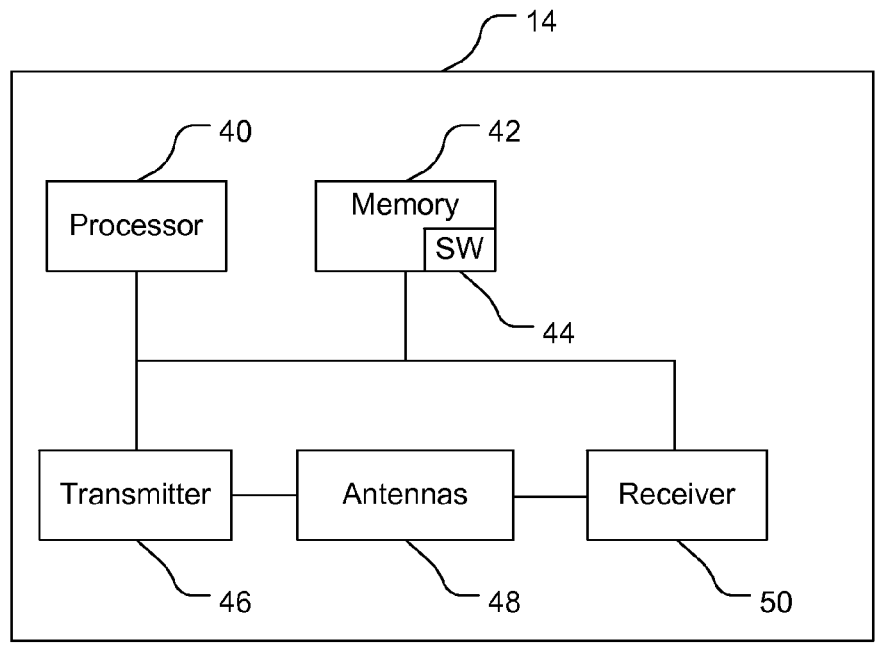
FIG. 3 is a block diagram of components of an underlay node shown in FIG. 1.
Figure 4:
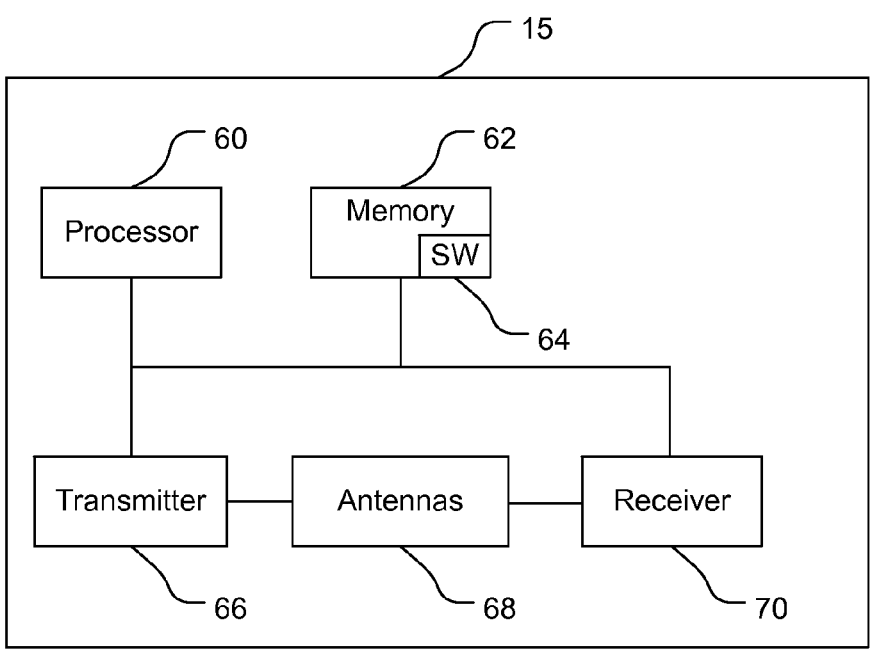
FIG. 4 is a block diagram of components of an overlay node shown in FIG. 1.

Referring also to FIGS. 3-4, an example of one of each of the nodes 14, 15 comprises, respectively, a computer system including a processor 40, 60, memory 42, 62, including software 44, 64, a transmitter 46, 66, antennas 48, 68, and a receiver 50, 70. While each of the nodes 14, 15 is respectively shown with a single processor 40, 60 and a single memory 42, 62 (with corresponding software 44, 64) the nodes 14, 15 may have a processor 40, 60 and a memory 42, 62 (with corresponding software 44, 64) for each sector served by the node 14, 15, e.g., each of three sectors. The transmitters 46, 66, the antennas 48, 68, and the receivers 50, 70 form wireless communication modules in the nodes 14, 15, respectively. The transmitters 46, 66 and the receivers 50, 70 are configured to communicate bi-directionally with the UEs 12 via the respective antennas 48, 68 in accordance with the respective radio access technology of the nodes 14, 15. The processors 40, 60 are each preferably an intelligent hardware device, e.g., a central processing unit (CPU) such as those made by ARM®, Intel® Corporation, or AMD®, a microcontroller, an application specific integrated circuit (ASIC), etc. Either or both of the processors 40, 60 could comprise multiple separate physical entities that can be distributed in the respective node 14, 15. The memories 42, 62 include random access memory (RAM) and read-only memory (ROM). The memories 42, 62 store the software 44, 64 which is computer-readable, computer-executable software code containing instructions that are configured to, when executed, cause the processor 40, 60 to perform various functions described herein. Alternatively, the software 44, 64 may not be directly executable by the processor 40, 60 but configured to cause the computer, e.g., when compiled and executed, to perform the functions. For simplicity, similar features of the nodes 14, 15 have been shown and described together, but the configurations of the nodes 14, 15 differ in order to implement the different radio access technologies. Further, similar features of the nodes 14, 15 may differ in other respects. For example, the processors 40, 60 may be of different types, the memories 42, 62 may have different component types, and/or the software 44, 64 on one node may be directly executable while on the other node it is not directly executable, etc.

The UEs 12 and the nodes 14, 15 are configured to communicate with each other. The UEs 12 and the nodes 14, 15 can send messages to each other that contain a variety of information. For example, the messages can contain signaling information which includes information to coordinate between layers of the system 10 (between an underlay node 14 and an overlay node 15) and/or to coordinate between the system 10 and another system. The signaling information may include one or more of timing information, frequency information, synchronization information, signal interfacing information, CELL identity (CELL_ID), power status indications (power ON or power OFF), power ON requests, power OFF requests, or responses to power ON/OFF requests. Synchronization information includes, for example, discontinuous reception (DRX) schedule or cycle information, discontinuous transmission (DTX) schedule or cycle information, window position and timing sample measurements, OFDM symbol timing and frame timing, and/or other synchronization measurements of a target cell that may facilitate a UE in a source cell joining, reselecting, or being handed off to, another target cell. For example, a designated UE 12 may measure timing and frequency offsets between two networks using conventional scrambling code acquisition and tracking and report back to the source cell, which provides the information to other UEs on the source cell to assist them in acquiring the target cell.

Figure 5:
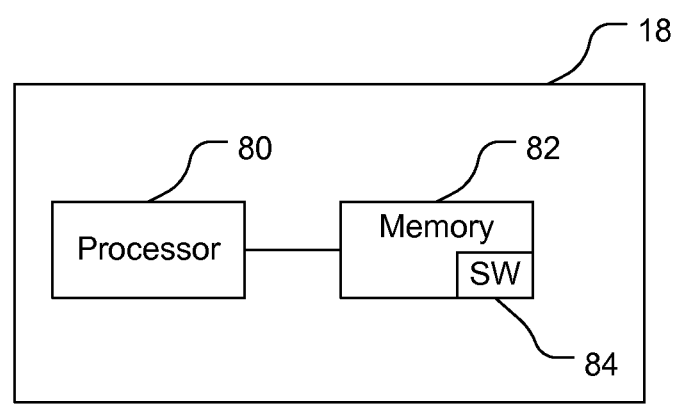
FIG. 5 is a block diagram of components of a system controller shown in FIG. 1.

Referring also to FIG. 5, the system controller 18 comprises a computer system including a processor 80 and memory 82, including software 84. The processor 80 is preferably an intelligent hardware device, e.g., a central processing unit (CPU) such as those made by ARM®, Intel® Corporation, or AMD®, a microcontroller, an application specific integrated circuit (ASIC), etc. The processor 80 could comprise multiple separate physical entities that can be distributed in the controller 18. The memory 82 includes random access memory (RAM) and read-only memory (ROM). The memory 82 stores the software 44 which is computer-readable, computer-executable software code containing instructions that are configured to, when executed, cause the processor 80 to perform various functions described herein. Alternatively, the software 84 may not be directly executable by the processor 860 but configured to cause the computer, e.g., when compiled and executed, to perform the functions.

Figure 6:
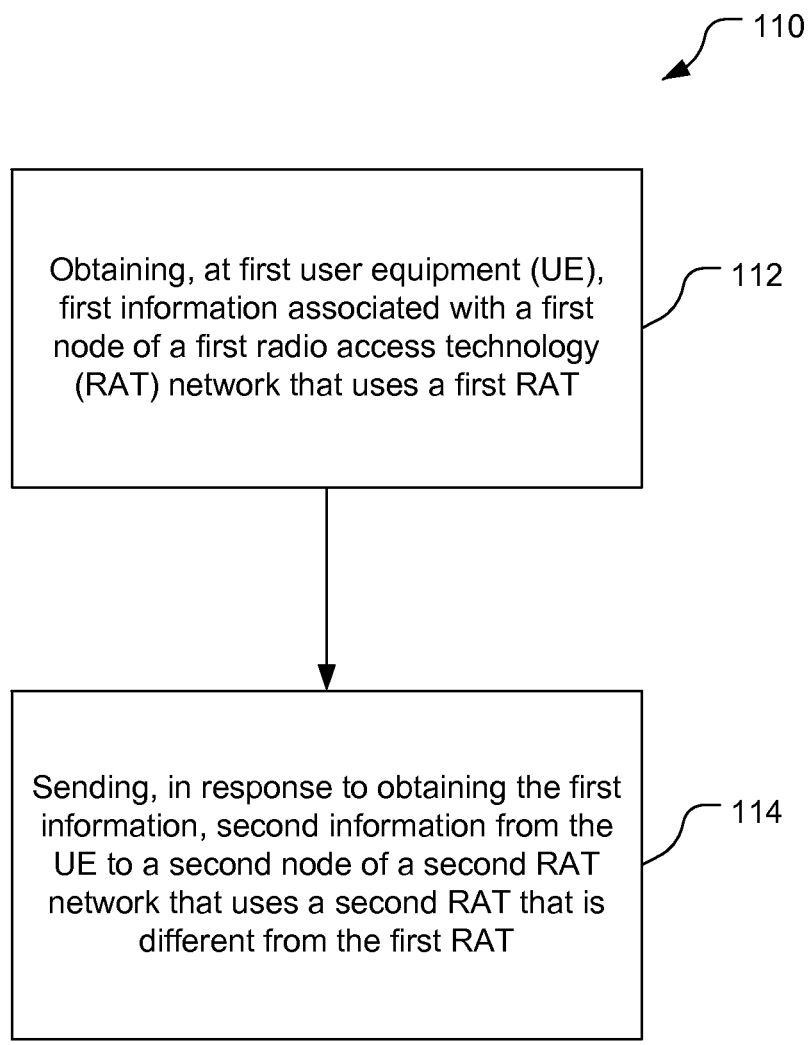
FIG. 6 is a block flow diagram of a process of interfacing with a wireless communication node.

Referring to FIG. 6, with further reference to FIGS. 1-5, a process 110 includes stages for interfacing with a wireless communication node. The process 110 is, however, an example only and not limiting.

At stage 112, a UE 12 obtains information associated with a first node. The UE 12 obtains first information associated with a first node of a first RAT network that uses a first RAT. The first information may be associated with the underlay RAT or the overlay RAT. Further, the first information may be implicitly or explicitly associated with the first node. For example, obtaining information that the overlay node 15 is needed for a service desired by the UE 12 is implicitly information that the underlay node 14 has an undesirable service ability for the desired service (i.e., cannot provide the desired service, at least not at a desired level of service). The UE 12 may obtain the first information in a variety of manners, e.g., by receiving it from the first node, or by the UE 12 determining the first information, e.g., through a measurement with the first node and/or the second node.

At stage 114, the UE 12 sends a message to a second node. The UE 12 responds to obtaining the first information by sending second information from the UE to a second node of a second RAT network that uses a second RAT that is different from the first RAT. For example, the second information may be signaling information configured to be used by a second UE to connect to the first node, or the second information may be a power status change request for the overlay node 15. The second node may be in a different RAT network (different layer), or even a different RAT system. The second information may be the first information, that is, it may be the same in content and possibly, though not necessarily, in format. Information regarding which network parameters to use while accessing the second node may also be provided to the UE 12 in the first information by the first node or pre-configured in the UE 12.

UE as a Relay

UEs 12 can be used as relays of information between the overlay and underlay RATs. Thus, information can be passed between RATs without using a backhaul connection between the RATs. To serve as a relay for the overlay RAT (sending information from the overlay RAT to the underlay RAT), the overlay node 15 preferably selects a UE 12 that is likely to enter the connected mode on the underlay RAT, for example, a UE 12 that frequently sends small packets of information to the overlay RAT because the UE 12 is connected to, but underutilizing, the overlay RAT. To serve as a relay for the underlay RAT (sending information from the underlay RAT to the overlay RAT), the underlay node 14 preferably selects a UE 12 whose user experience will not be significantly affected by transitioning from connected mode on the underlay RAT to idle mode on the underlay RAT (e.g., UEs engaged in email but not video chatting), and from idle to connected mode on the overlay RAT. The underlay node 14 selects a UE 12 whose quality of service (QoS) will be maintained above a QoS acceptability threshold despite such transitions. Different activities will have different QoS acceptability thresholds, e.g., with email having a relatively low QoS acceptability threshold while video chat and video streaming have relatively high QoS acceptability thresholds. For example, underlay node 14 can assess energy consumption of the UEs 12, geographic location of the UEs 12 (especially relative to the overlay nodes 15), and energy consumption to transition to connected mode on the overlay RAT, and can select a UE 12 to use as a relay, e.g., to reduce energy consumption relative to the status quo. The selected UE 12 will be able to connect to both the underlay RAT and the overlay RAT, and preferably will have significant remaining battery life. In the discussion below, the nodes 14, 15 both include the respective radio network controller functionality.

Figure 7:
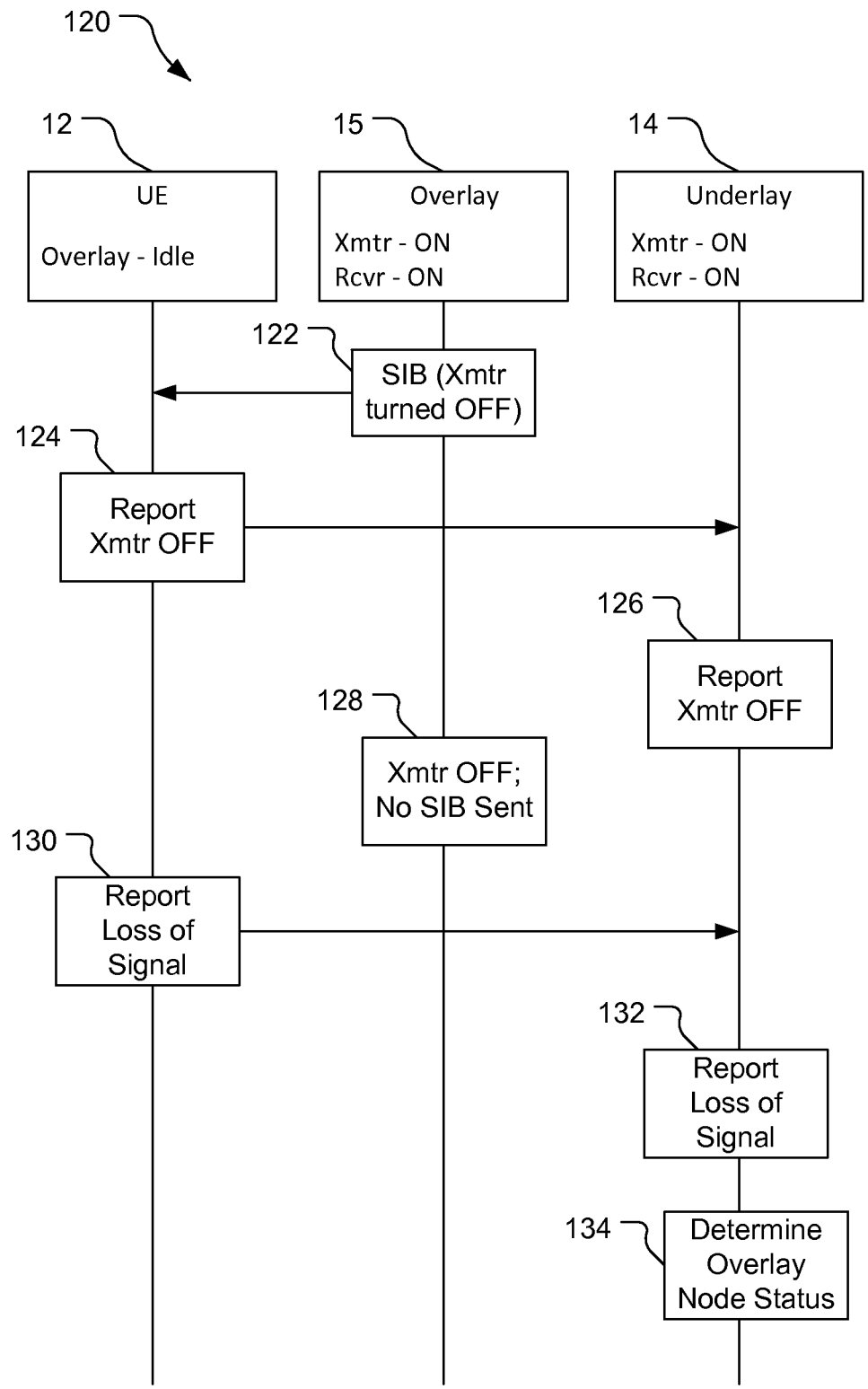
FIG. 7 is a block, swim-lane flow diagram of a process whereby an idle mode UE on an overlay RAT relays an overlay transmitter OFF notification to an underlay node.

Referring to FIG. 7, with further reference to FIGS. 1-5, a process 120 includes stages by which an idle mode UE on the overlay node 15 relays a transmitter OFF status from the overlay node 15 to the underlay node 14. The process 120 is, however, an example only and not limiting. At the outset of the process 120, the UE 12 is in idle mode on the overlay node 15 and the overlay node 15, although currently powered ON, has decided to enter into a power saving mode Further, the overlay node 15 has its transmitter 66 ON and its receiver 70 ON while the underlay node 14 has its transmitter 46 ON and its receiver 50 ON.

At stages 122, 124, 126, an indication that the overlay node 15 is going to turn OFF is sent, received, reported, and acted upon. At stage 122, the node 15 sends System Information Blocks (SIBs) to UEs 12 in its cell indicating that the transmitter 66 of the overlay node 15 will be turned OFF. In some cases, the transmitter 66 and the receiver 70 may both be powered OFF for greater energy savings in the overlay node 15. At stage 124, the UE 12 receives the SIBs and sends corresponding information. The UE reports to the underlay node 14 that the transmitter 66 of the particular overlay node 15 will be turned OFF. At stage 126, the underlay node 14 notes that the particular overlay node 15 will be turned OFF and uses this information as appropriate to coordinate communication in the system 10.

Alternatively to stages 122, 124, 126, at stages 128, 130, 132, 134 loss of overlay node signal is reported and interpreted. At stage 128, the overlay node transmitter 66 turns OFF without the overlay node indicating this transition. The node 15 does not send a SIB or other specific message indicating that the node 15 is turning the transmitter OFF, the node 15 simply stops transmitting. At stage 130, the UE 12 determines that there is no more signal coming from the overlay node 15, so the UE 12 searches for available cells, finds the underlay RAT and reports the loss of signal to the underlay node 14. The UE 12 can report the signal loss on the previous in a registration cause during registration/LAU/RAU (Location Area Update/Routing Area Update) on the underlay RAT. If the underlay node 14 and the overlay node 15 are in the same location area code (LAC) and thus no registration is performed (which is very unlikely), then the UE 12 will send a message in the new RAT to report the previous cell and status. At stage 132, the underlay node 14 notes the loss of signal and determines the status of the overlay node 15. The underlay node 14 further analyzes information from one or more of the UEs 12 to determine the overlay node status. For example, the underlay node 14 can analyze the registration cause, number of updates received, time frame within which the updates are received, present location (e.g., cell) of the UEs 12 reporting the loss of signal, previous location (e.g., cell) of the UEs 12 reporting the loss of signal, etc. Thus, for example, if the underlay node 14 accumulates reports from a threshold number of UEs 12 within a specified time frame that signal has been lost from the same overlay node 15, then the underlay node 14 can determine that the status of that node 15 is transmitter OFF, and otherwise leave the status as transmitter ON.

Figure 8:
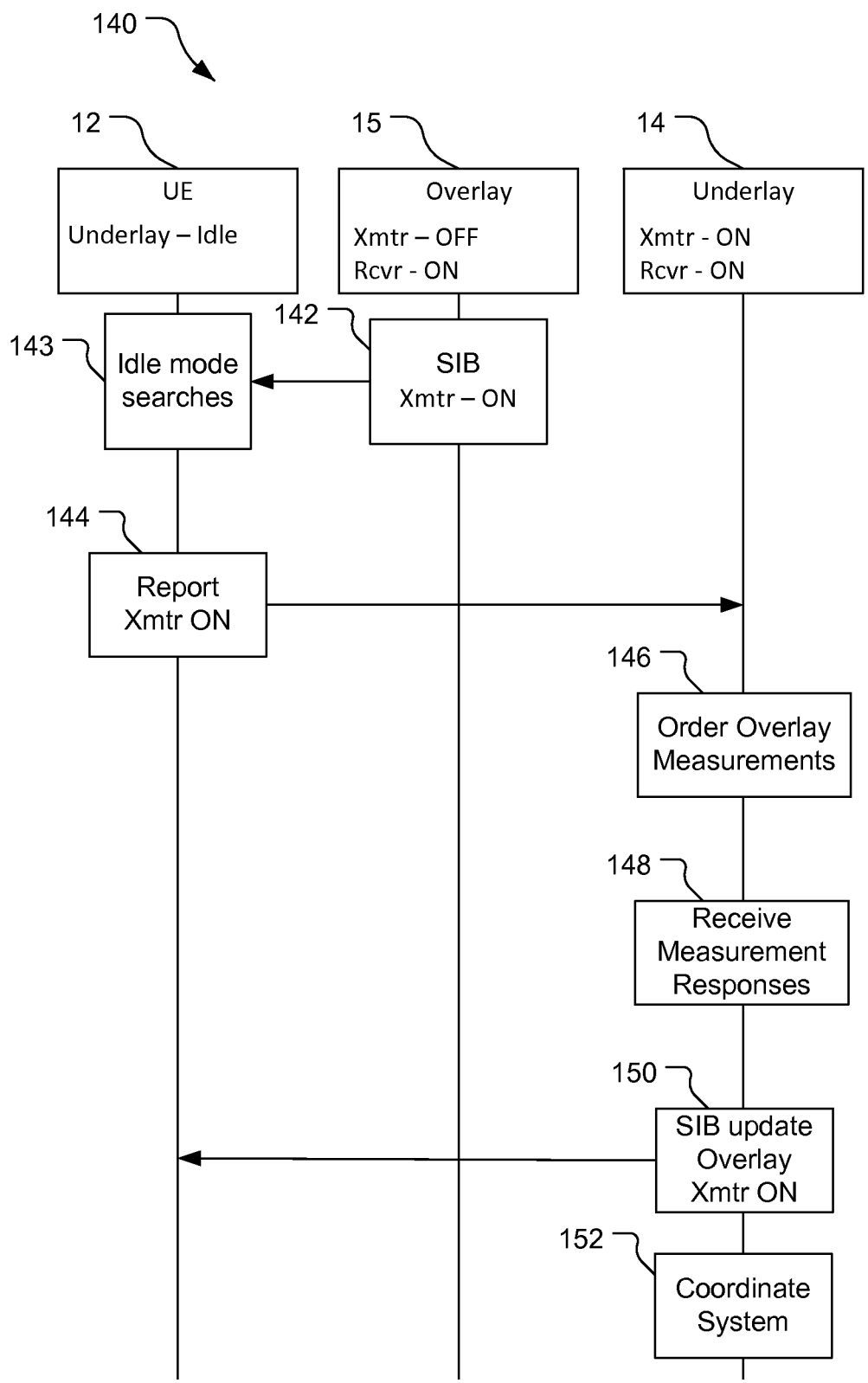
FIG. 8 is a block, swim-lane flow diagram of a process whereby an idle mode UE on an underlay RAT relays an overlay transmitter ON notification to an underlay node.

Referring to FIG. 8, with further reference to FIGS. 1-5, a process 140 includes stages by which an idle mode UE 12 on the underlay node 14 relays a transmitter ON status notification from the overlay node 15 to the underlay node 14. The process 140 is, however, an example only and not limiting. For example, as discussed below, stages 146 and 148 can be omitted or stage 146 may be performed differently than as shown. At the outset of the process 140, the UE 12 is in idle mode with the underlay node 14, the underlay node 14 has its transmitter 46 ON and its receiver 50 ON while the overlay node 15 has its transmitter 66 OFF and its receiver 70 ON. Also, the underlay node 14 sends SIBs within its cell 16, with the SIBs including information regarding an overlay cell 17 and the power status of that overlay cell 17. The information regarding the overlay cell of the overlay node 15 could be used by the UE 12 to attempt to search for or access the overlay node 15.

At stage 142, the overlay node 15 turns its transmitter 66 ON and starts transmitting SIB messages while the idle mode UE 12 on the underlay node 14 is performing idle mode searches for cells the UE's neighborhood. At stage 143, the UE 12 detects the SIB during an idle mode search and at stage 144 reports the receipt of a transmission from an overlay node 15 that the UE 12 believed had its transmitter 66 OFF. The UE 12 determines that a previously powered OFF overlay node 15, as indicated in the SIBs received from the underlay RAT before the idle search, is ON based upon the UE 12 receiving SIBs from the overlay node 15. That is, the UE 12 deduces that the transmitter 66 is ON based on the fact that the UE 12 received a communication from that node 15. The UE 12 determines that the node 15 has recently turned ON by analyzing the power status of overlay nodes 15 indicated by the underlay RAT in underlay SIBs. If the power status of the node 15 from which the SIB is received in stage 142 is indicated as OFF, then the UE 12 concludes that that node 15 recently turned ON. The UE 12 sends a report to the underlay node 14 that that overlay node 15 has turned ON. The UE 12 sends the report, for example, during a periodic report or during an event-triggered registration.

At stage 146, the underlay node 14 may respond to the receipt of the report from the UE 12 at stage 144 by instructing some connected mode UEs 12 to take measurements of the overlay node 15 to determine if the overlay node 15 is ON. At stage 148, the underlay node 14 receives measurement responses from the other UEs 12. At stage 150, if a sufficient amount of UEs 12 have reported that the overlay node 15 is ON (i.e., has its transmitter 66 ON), then the underlay node 14 updates the power status in its own SIBs to indicate that the transmitter power status of the overlay node 15 is ON. The sufficient amount may be, for example, an absolute number, e.g., 2, 3, etc., or may be a percentage, e.g., 60% of the responses indicated that the node 15 is ON, or a combination of quantity and percentage, e.g., at least 2 UEs and at least 50% of responses. The percentage used may vary, e.g., depending upon the transmit power of the overlay node 15, locations of the UEs within a cell 17, and whether (based on the transmit power and UE locations) the UEs should be able to measure the overlay RAT.

At stage 152, the underlay node 14 coordinates the system 10, for example, by transferring UEs 12 to the overlay node 15 that recently turned ON.

Alternatively, stages 146 and 148 can be omitted from the process 140. In this case, the underlay node 14 responds to a single report by the UE 12 noting the power status change, e.g., by changing the power status of the overlay node 15 to ON in the underlay node's SIBs.

Figure 9:
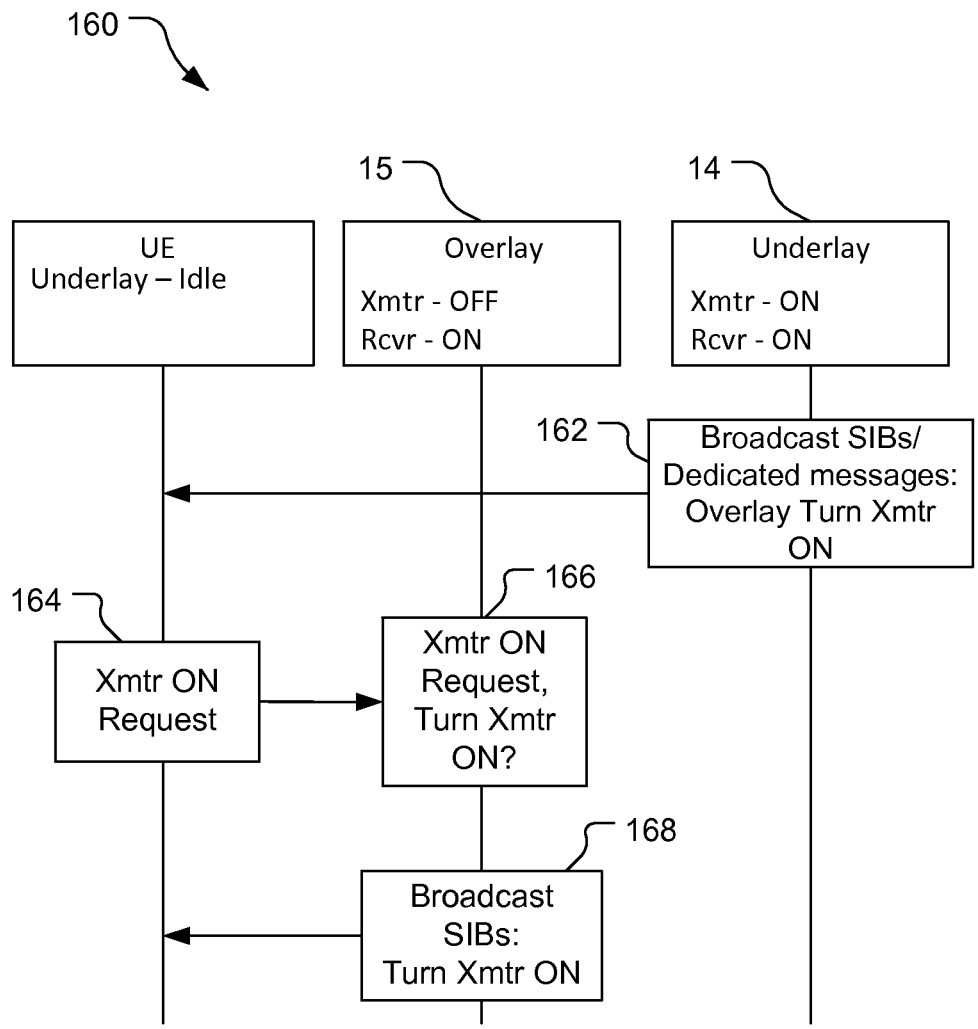
FIG. 9 is a block, swim-lane flow diagram of a process whereby an idle mode UE on the underlay RAT relays a transmitter ON request to an overlay node.

Referring to FIG. 9, with further reference to FIGS. 1-5, a process 160 includes stages by which an underlay node 14 can request the transmitter 66 of the overlay node 15 to be turned ON by relaying messages through a UE 12 in idle mode on the underlay node 14. The process 160 is, however, an example only and not limiting. At the outset of the process 160, the underlay node 14 has its transmitter 46 ON and its receiver 50 ON while the overlay node 15 has its transmitter 66 OFF and its receiver 70 ON. Further, the UE 12 is in an idle mode with the underlay RAT. Some other UEs 12 will have similar status with the underlay RAT while some other UEs 12 could be in a connected mode on the underlay RAT.

At stage 162, the underlay node 14 sends a message to the UE(s) 12 to have the UE(s) 12 request the overlay node to turn ON. For connected UEs 12, the underlay node 14 send dedicated messages and for idle UEs 12, the underlay node 14 broadcasts SIBs. In either format, the messages request a power status change, i.e., request the UEs 12 to send the overlay node 15 a power status change request, here to turn ON. The underlay node 14 sends these messages in response to a trigger (e.g., determining that the node 14 is overloaded, receiving an indication that there are UEs 12 currently connected to the node 14 that require premium services that the node 14 does not support, or receiving an indication that the node 14 should request an overlay node 15 to be turned ON). The underlay node 14 sends one or more broadcast SIBs (or dedicated requests) requesting that the UE 12 send a request to the overlay node 15 to turn ON. While only one UE 12 is discussed here, preferably more than one UE 12 will receive and respond to the one or more SIBs (or dedicated requests).

At stage 164, the UE 12 sends a request for the overlay node 15 to turn ON. The UE 12 decodes and responds to the request from the underlay node 14 at stage 162 by producing and sending a request to the overlay node 15 for the overlay node 15 to turn its transmitter 66 ON. If a connected mode UE 12 on the underlay node 14 decides to send the turn ON request message, the UE 12 first tears down its connection with the underlay node 14 before sending such a message.

At stage 166 the overlay node 15 receives the message from the UE 12 and responds to receiving the turn ON request by determining whether to turn its transmitter 66 ON. For example, the overlay node 15 analyzes the degree to which the underlay node 14 is overloaded, the degree of need (e.g., preferred, required, etc.) of the overlay node 15 for a service requested by the UE 12, etc. If the overlay node 15 determines that it should be turned ON, then at stage 168 the overlay node 15 turns ON its transmitter ON and starts broadcasting SIBs. If at stage 168 the node 15 decides not to turn its transmitter 66 ON, the node 15 could either remain in the present power state without informing the UE 12 or the node 15 could decide to send a notification message to that UE 12 or send a broadcast SIB message.

Figure 10:
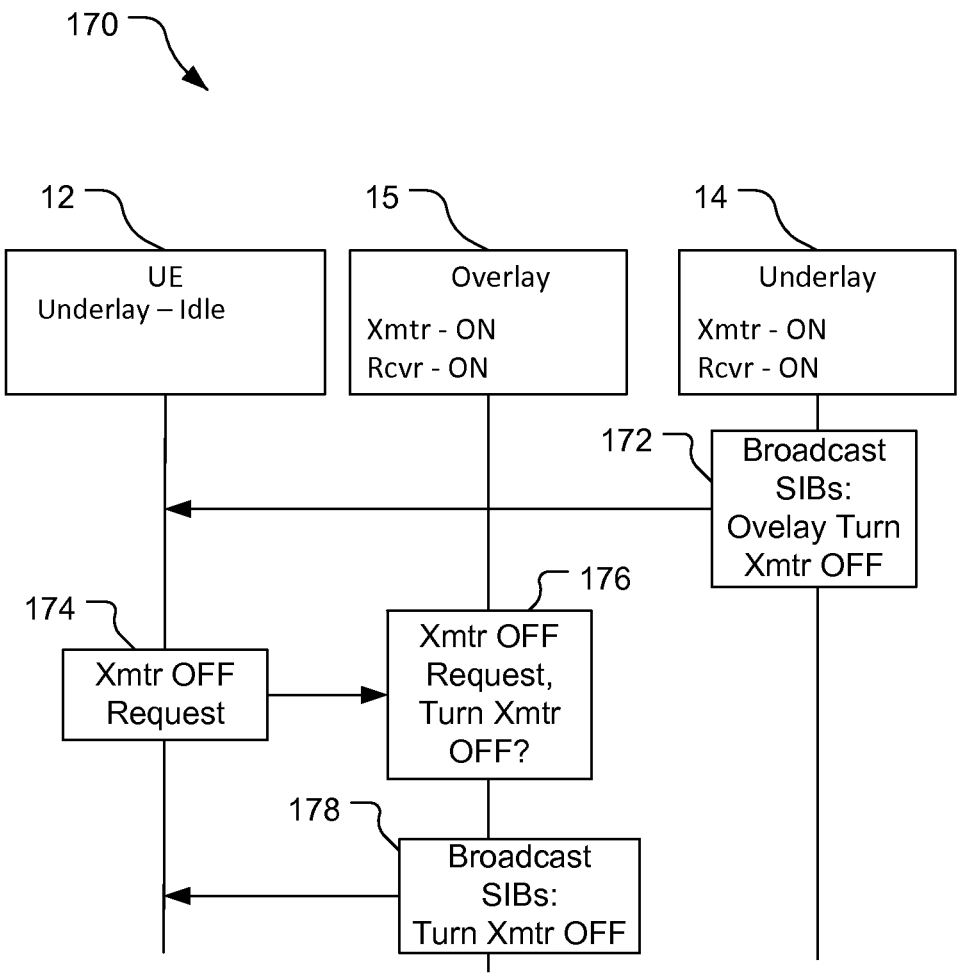
FIG. 10 is a block, swim-lane flow diagram of a process whereby an idle mode UE on the underlay RAT relays a transmitter OFF request to an overlay node.

Referring to FIG. 10, with further reference to FIGS. 1-5, a process 170 includes stages by which an underlay node 14 can request the transmitter 66 of the overlay node 15 to be turned OFF by relaying messages through a UE 12 in idle mode on the underlay node 14. The process 170 is, however, an example only and not limiting. At the outset of the process 170, the UE 12 is in an idle mode with the underlay RAT. Some other UEs 12 will have similar status with the underlay RAT while some other UEs 12 will be in connected mode with the underlay RAT. Further, the overlay node 15 has its transmitter 66 ON and its receiver 70 ON while the underlay node 14 has its transmitter 46 ON and its receiver 50 ON.

At stage 172, the underlay node 14 broadcasts requests for the UE 12 to request the overlay node 15 to turn OFF. For connected UEs 12, the underlay node 14 sends dedicated messages while idle UEs 12 receive the message from the SIBs. In either format, the messages request a power status change, i.e., request the UEs 12 to send the overlay node 15 a power status change request, here to turn OFF. The underlay node 14 responds to a trigger (e.g., determining that the node 14 is underutilized, determining that the overlay node 15 is interfering with the underlay node 14, determining that one or more UEs 12 (e.g., high data rate UEs) have quality of service (QoS) demands that would be improved if the overlay node 15 is turned OFF, determining that the node 14 could absorb the usage of the node 15, or receiving an indication (e.g. from core network entities) that the node 14 should request an overlay node to be turned OFF) by sending one or more broadcast SIBs (or dedicated requests) requesting that the UE 12 send a request to the overlay node 15 to turn OFF. While only one UE 12 is discussed here, preferably more than one UE 12 will receive and respond to the one or more SIBs (or dedicated requests).

At stage 174, the UE 12 sends a request for the overlay node 15 to turn OFF. The UE 12 decodes and responds to the request from the underlay node 14 at stage 172 by producing and sending a request to the overlay node 15 for the overlay node 15 to turn its transmitter 66 OFF.

At stage 176, the overlay node 15 responds to receiving the turn OFF request by determining whether it should turn its transmitter 66 OFF. For example, the overlay node 15 analyzes the number of such requests received recently, e.g., within a predetermined window of time ending at the present time (i.e., within a threshold amount of time prior to the present time). If a sufficient number (quantity) of OFF requests are received within this time, the node 15 could determine to turn its transmitter 66 OFF. The threshold number of requests that are sufficient may depend on the present load of the node 15, with the threshold being higher for higher present loads on the overlay node 15 (possibly with an upper limit on the threshold) and being lower for lesser present loads on the overlay node 15 (possibly with a lower limit on the threshold). If at stage 176, the overlay node 15 rejects the turn OFF request, the overlay node 15 could either remain in its present power state without informing the UE 12 that forwarded the request or the node 15 could decide to send a notification message to that UE 12 directly or in a SIB message.

At stage 178, once the decision to turn OFF is made, the overlay node 15 can inform surrounding UEs 12 by sending a turn OFF notification in a SIB message. Alternatively, the overlay node 15 can turn its transmitter 66 or both its transmitter 66 and receiver 70 OFF without notifying surrounding UEs 12.

Figure 11:
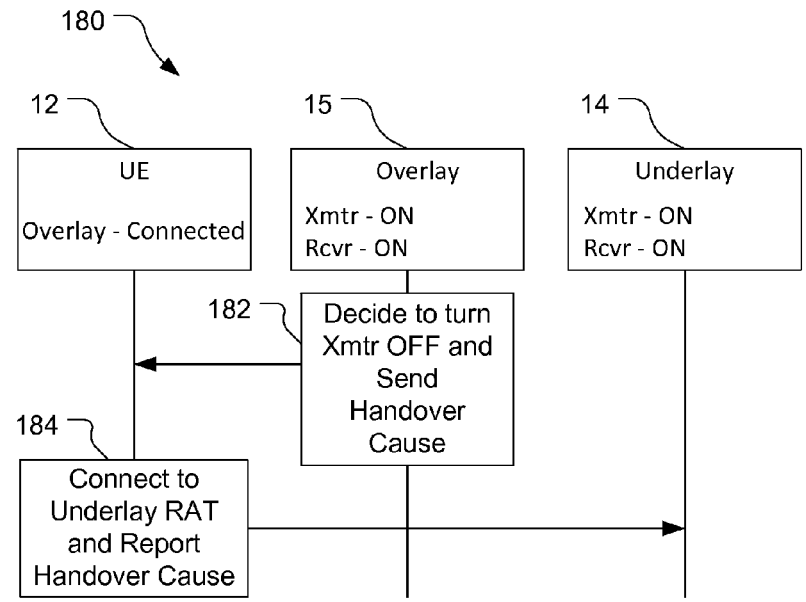
FIG. 11 is a block, swim-lane flow diagram of a process whereby a connected mode UE on the overlay RAT relays an overlay transmitter OFF notification to an underlay node.

Referring to FIG. 11, with further reference to FIGS. 1-5, a process 180 includes stages by which an overlay node 15 with the transmitter 66 turned ON (but about to be turned OFF) relays a turn OFF notification to an underlay node 14 via UEs 12 that are in connected mode on the overlay node 15. The process 180 is, however, an example only and not limiting. At the outset of the process 180, the UE 12 is in connected mode with the overlay RAT, i.e., connected with the overlay node 15. Further, the overlay node 15 has its transmitter 66 ON and its receiver 70 ON while the underlay node 14 has its transmitter 46 ON and its receiver 50 ON.

Prior to stage 182, the handover process may have been initiated so that the overlay node 15 can transfer the connected mode UE 12 to the underlay node 14 before the overlay node 15 turns OFF its transmitter 66. Due to the standard format of handover messages and complexity required to implement changes in these messages, it is more effective to send the turn OFF notification through the UE 12.

At stage 182, the overlay node 15 sends a turn OFF notification message to the underlay node 14 with an indication of the handover cause. The overlay node 15 is about to turn its transmitter OFF and handover the UE 12 to the underlay node 14. The overlay node 15 is not going to inform the underlay RAT through a backhaul of the handover cause. Instead, the overlay node 15 sends a dedicated message to the connected UE 12 indicating the handover cause. Then the overlay node 15 turns its transmitter 66 OFF.

At stage 184, the UE 12 decodes the received message from the overlay node 15 and reports the handover cause after the UE's call has been handed over to the underlay node 14 and the UE 12 has established connection with the underlay node 14. The UE 12 reports the message by sending an indication of the handover cause indicated by the overlay node 15.

Figure 12:
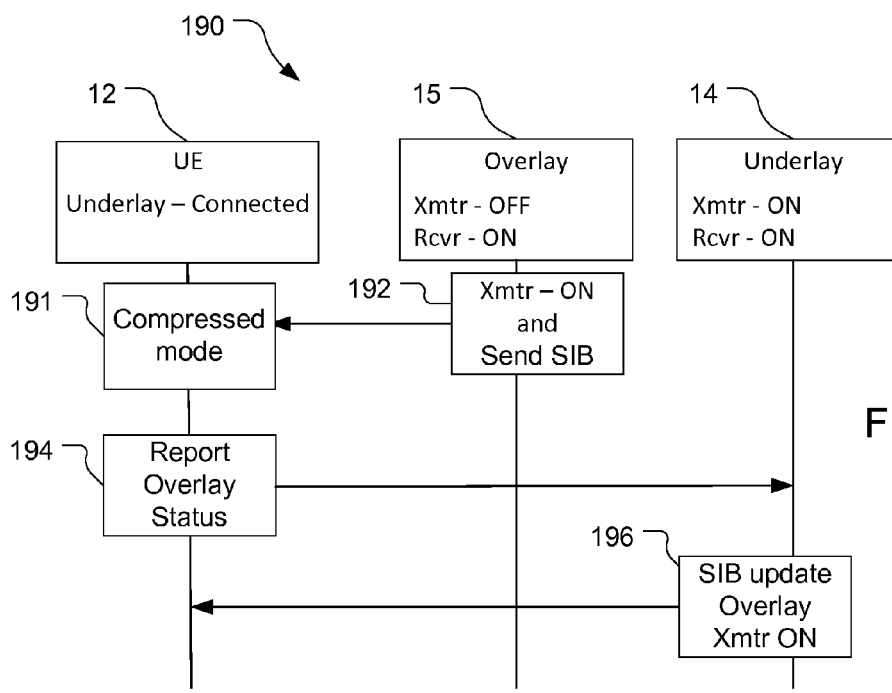
FIG. 12 is a block, swim-lane flow diagram of a process whereby a connected mode UE on the underlay RAT relays an overlay transmitter ON notification to an underlay node.

Referring to FIG. 12, with further reference to FIGS. 1-5, a process 190 includes stages by which an overlay node 15 with the transmitter 66 turned OFF (but about to be turned ON) relays a turn ON notification to an underlay node 14 via UEs 12 that are in connected mode on the overlay node 14. The process 190 is, however, an example only and not limiting. At the outset of the process 190, the UE 12 is in connected mode with the underlay RAT, i.e., connected with the underlay node 14. Further, the overlay node 15 has its transmitter 66 OFF (but about to be turned ON) and its receiver 70 ON while the underlay node 14 has its transmitter 46 ON and its receiver 50 ON.

At stage 191, the UE 12 is in connected mode on the underlay RAT but also in compressed mode whereby the underlay RAT grants the UE 12 autonomous gaps during which the UE 12 listens to (searches for) SIBs from the overlay RAT, in particular SIBs from overlay nodes 15 whose present transmitter status is considered OFF by the underlay RAT. At stage 192, the overlay node 15 turns ON its transmitter 66 and broadcasts SIBs.

At stage 194, the UE 12 reports overlay node status to the underlay node 14. The UE 12 recognizes from the receipt of the SIB from the overlay node 15 that the transmitter status of the overlay node 15 is now ON, and reports the change in transmitter status of the overlay node 15 to the underlay node 14.

At stage 196, the underlay node 14, updates its SIBs reflecting the new power status of the overlay node 15.

Figure 13:
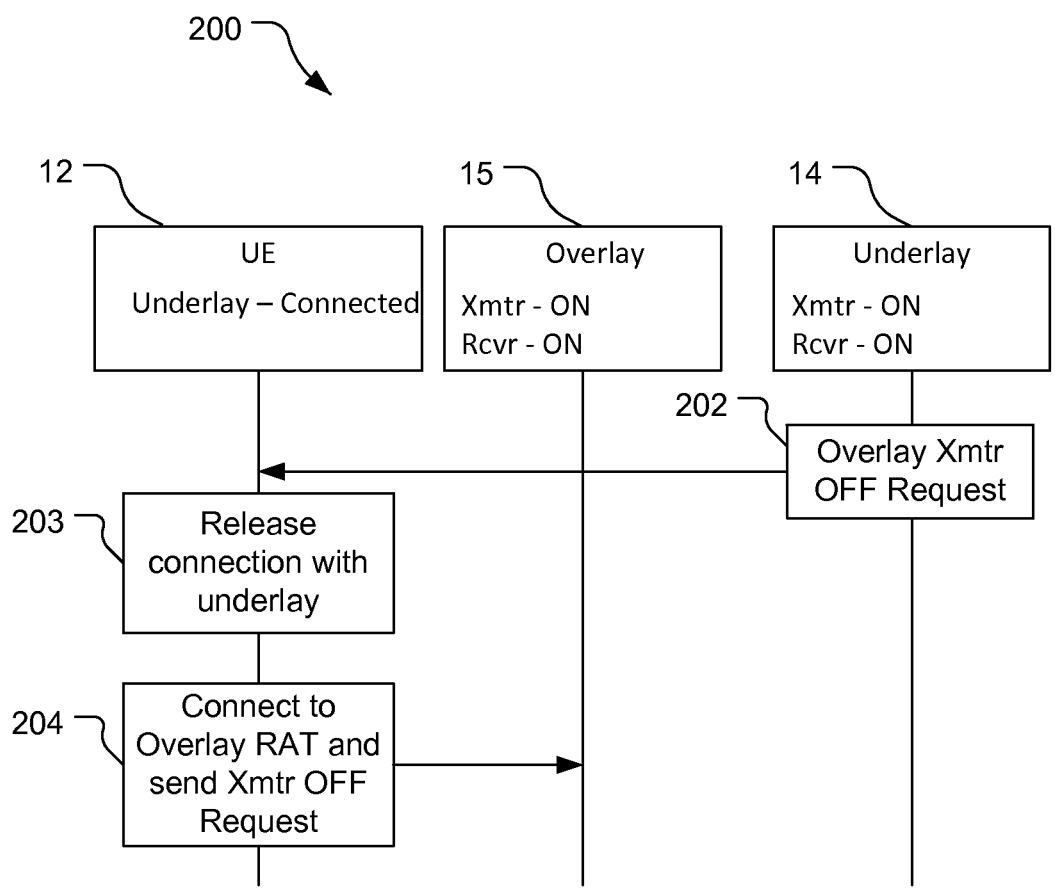
FIG. 13 is a block, swim-lane flow diagram of a process whereby a connected mode UE on the underlay RAT relays an overlay transmitter OFF request to an overlay node.

Referring to FIG. 13, with further reference to FIGS. 1-5, a process 200 includes stages by which an underlay node 14 relays a turn OFF request to an overlay node 14 via a UE 12 that is in connected mode on the underlay node 14. The process 200 is, however, an example only and not limiting. At the outset of the process 200, the UE 12 is in connected mode with the underlay RAT, i.e., connected with the underlay node 14. Further, the overlay node 15 has its transmitter 66 ON and its receiver 70 ON while the underlay node has its transmitter 46 ON and its receiver 50 ON.

At stage 202, the underlay node 14 sends a request for an overlay turn OFF request. The underlay node 14 sends a dedicated message to the connected UE 12. Although only one UE 12 is shown, the underlay node 14 preferably sends such a dedicated message to multiple UEs 12 connected to the underlay node 14 that are likely to be within access range of the overlay node 15 and UEs 12 whose user experience would not be significantly affected by a later disconnection from the underlay RAT. The underlay node 14 may send the request, e.g., in response to, for example, determining that the overlay node is interfering too much with other communications, that a cost-benefit analysis reveals that the energy saved and/or performance improvement experienced by UEs 12 by turning the overlay node transmitter 66 OFF outweighs the loss of service, etc.

At stage 203, after receiving the request from the underlay node 14, the UE 12 releases its connection from the underlay node 14. At stage 204, the UE 12 connects to the overlay RAT and requests the overlay node's 15 transmitter 66 to turn OFF. To send the request, the UE 12 sets up a connection with the overlay node 15 and communicates the request via a data message or through registration/LAU/RAU messages. Further processing of this request can proceed similarly to stages 176, 178, 179 of FIG. 10.

Figure 14:
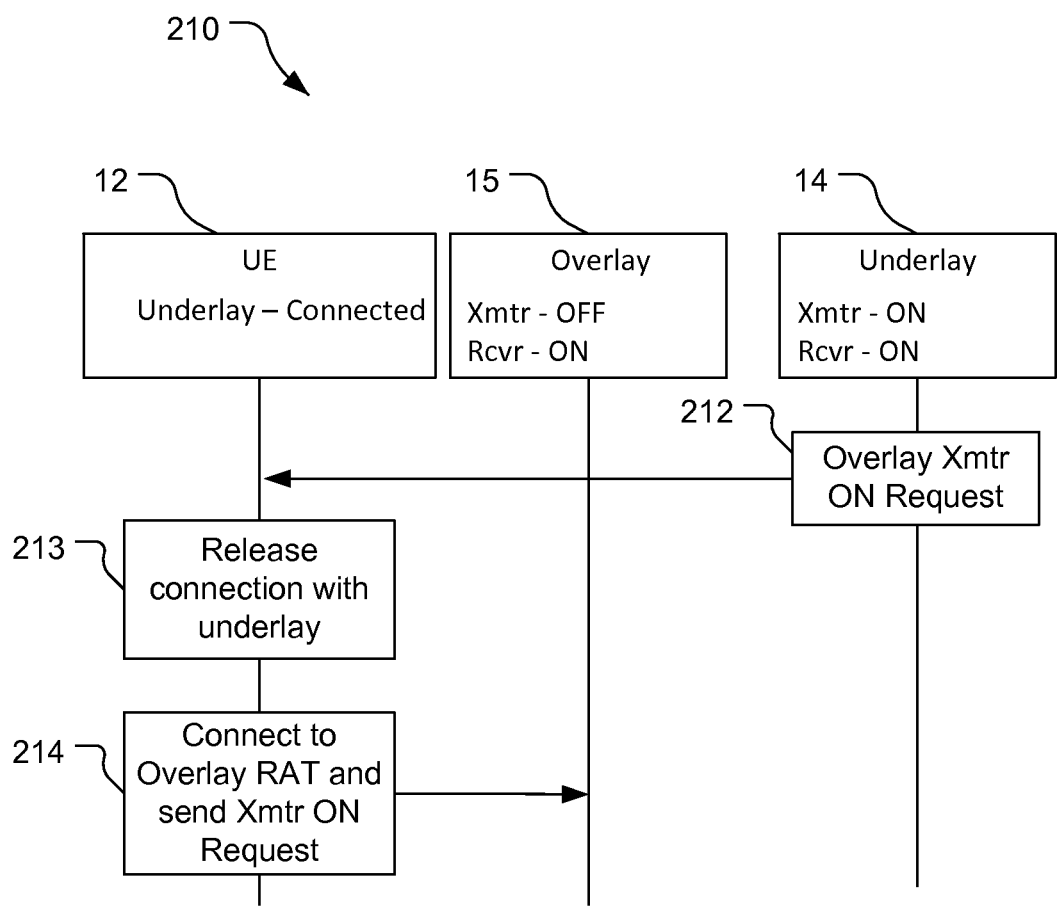
FIG. 14 is a block, swim-lane flow diagram of a process whereby a connected mode UE on the underlay RAT relays an overlay transmitter ON request to an overlay node.

Referring to FIG. 14, with further reference to FIGS. 1-5, a process 210 includes stages by which an underlay node 14 relays a turn ON request to an overlay node 14 via a UE 12 that is in connected mode on the underlay node 14. The process 210 is, however, an example only and not limiting. At the outset of the process 210, the UE 12 is in connected mode with the underlay RAT, i.e., connected with the underlay node 14. Further, the overlay node 15 has its transmitter 66 OFF and its receiver 70 ON while the underlay node has its transmitter 46 ON and its receiver 50 ON.

At stage 212, the underlay node 14 sends a request for an overlay turn ON request. The underlay node 14 sends a dedicated message to the connected UE 12. Although only one UE 12 is shown, the underlay node 14 preferably sends such a dedicated message to multiple UEs 12 connected to the underlay node 14 that are likely within access range of the overlay node 15 and UEs 12 whose user experience would not be significantly affected by a later disconnection from the underlay RAT. The underlay node 14 preferably does not send the request to a UE 12 unless the underlay node 14 knows that the overlay node 15 has its receiver 70 ON. The underlay node 14, however, could send the request even if the underlay node 14 does not know whether the overlay receiver 70 is ON. The underlay node 14 preferably knows which overlay nodes 15 have their transmitters 70 ON from information received from the overlay nodes 15 directly, or from the UEs 12.

At stage 213, the UE 12 responds to the request received from the underlay node 14 by releasing the connection to the underlay node 14 and, at stage 214, by sending the overlay node 15 (indicated in the message from the underlay node 14 that the underlay node 14 now has its receiver 70 ON) a request to turn its transmitter 66 ON. Further processing of this request can proceed similarly to stages 166, 168, 169 of FIG. 9.

UE as an Initiator

The UEs 12 can act as initiators of communications to the nodes 14, 15, especially to request changes in status. For example, the UE 12 can assess the signal strength received at the UE 12 and/or assess a need level (e.g., required, preferred, etc.) of an application or service and/or assess QoS demands of the UE 12 relative to available service with an overlay node 15 ON or OFF and/or assess whether the UE 12 has information for accessing an overlay node 15 that has its transmitter 66 OFF and/or assess other factors, to determine whether to request one or more overlay nodes 15 to turn the respective transmitter(s) 66 ON or OFF. The UE 12 can be on the underlay RAT while carrying out an evaluation whether to initiate a turn OFF/ON command to the overlay node 15. Likewise, the UE 12 could be on the overlay RAT if the overlay receiver 70 and transmitter 66 are turned on while the UE 12 evaluates whether to initiate a turn OFF message to the overlay node 15. The UE 12 will send each such request directly to the overlay node 15. The UE 12 can send the request directly to the overlay node 15 because the UE 12 receives overlay node configuration information from the underlay nodes 14 or from the overlay node 15 itself before the transmitter 66 was turned off. Whether the UE 12 is camping on the underlay node 14 or the overlay node 15, the overlay node 15 will have its receiver 70 ON and thus can receive requests from the UE 12 directly that are sent by the UE 12 using the overlay node configuration information (parameters). When acting as an initiator, the UE 12 self-selects in one or more ways similar to the UE selection done by the underlay node 14 or the overlay node 15 as discussed above.

Figure 15:
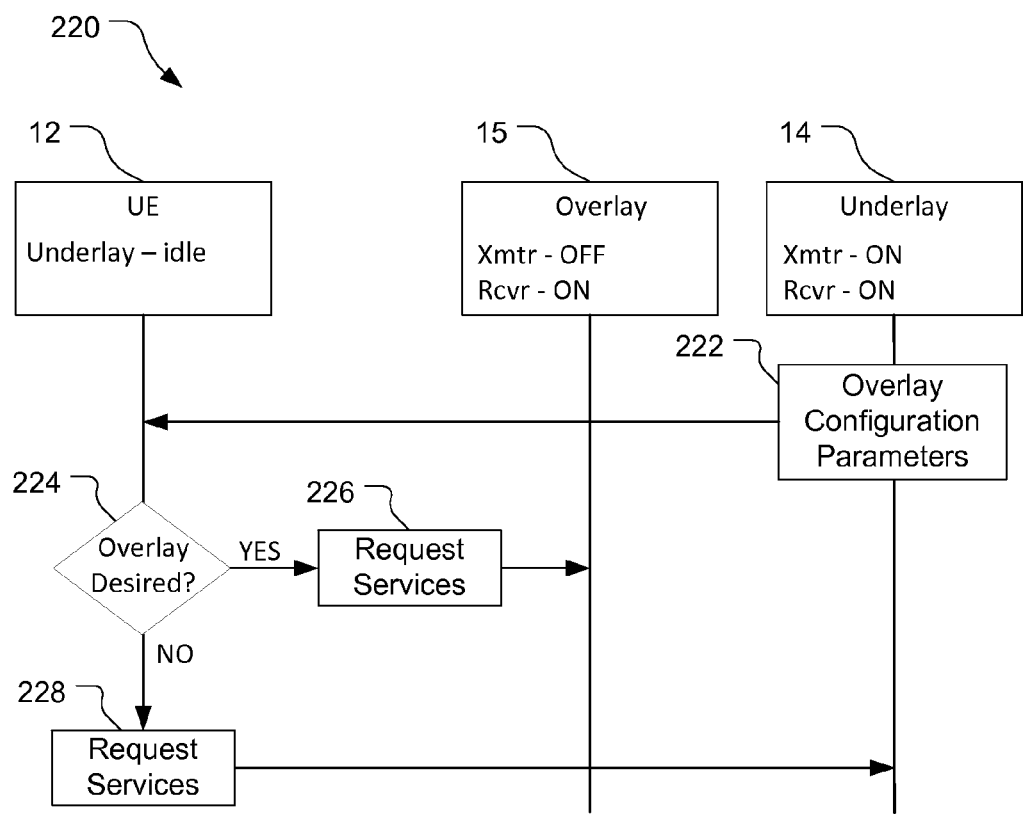

Referring to FIG. 15, with further reference to FIGS. 1-5, a process 220 includes stages by which an idle-mode UE camping on the underlay RAT initiates messages to the overlay RAT recommending that the overlay node 15 turn ON its transmitter 66. The process 220 is, however, an example only and not limiting. At the outset of the process 220, the UE 12 is in idle mode on the underlay RAT. Further, the overlay node 15 has its transmitter 66 OFF and its receiver 70 ON while the underlay node has its transmitter 46 ON and its receiver 50 ON.

At stage 222, the underlay node 14 sends overlay node configuration parameters. The underlay node 14 sends parameters to the UE 12 that the UE 12 can use to connect with, or send requests to, the overlay node 15. This information can be sent as a dedicated or broadcast message.

At stage 224, a determination is made as to whether connection to the overlay node 15 is desired, or possibly needed/required, by the UE 12. The UE 12 determines, based on one or more policies stored within the UE 12, whether the services (e.g., an application, speed, etc.) desired by the UE 12 make connection to the overlay node 15 desirable or necessary. In other words, the UE 12 determines that the underlay node 14 cannot provide a desired service, or cannot provide the desired service with a desired level of service. If the UE 12 determines that connection to the overlay node 15 is desired, then the process 220 proceeds to stage 226, and otherwise proceeds to stage 228.

At stage 226, overlay node services are requested. The UE 12 sends a request to the overlay node 15 to turn its transmitter 66 ON such that the UE 12 will be able to connect to and receive service from the overlay node 15.

At stage 228, services are requested from the underlay node 14. The UE sends a request to the underlay node to connect to and receive services from the underlay node 14.

Figure 16:
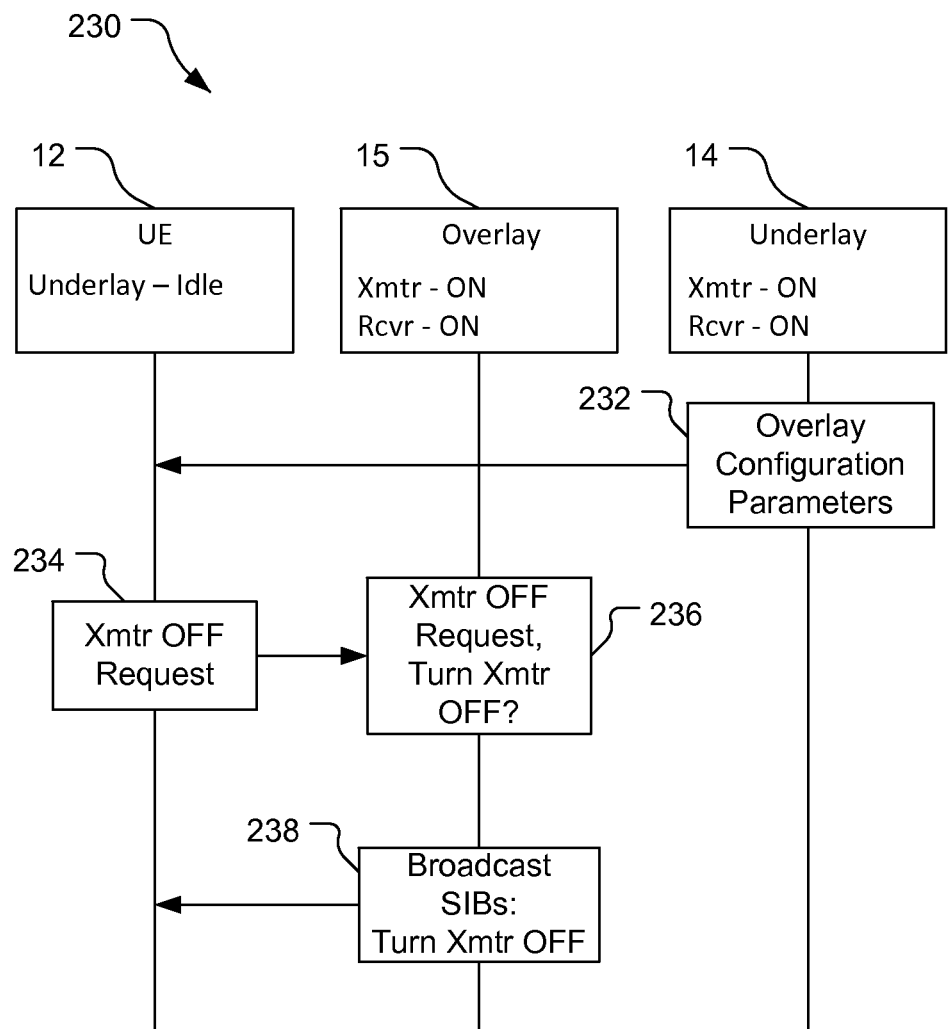
FIG. 16 is a block, swim-lane flow diagram of a process of an underlay-idle-mode UE initiating overlay cell turn OFF.

Referring to FIG. 16, with further reference to FIGS. 1-5, a process 230 includes stages by which an idle-mode UE 12 camping on the underlay RAT initiates an overlay node turn OFF messages. The process 230 is, however, an example only and not limiting. At the outset of the process 230, the UE 12 is in idle mode with the underlay RAT. Further, the overlay node 15 has its transmitter 66 ON and its receiver 70 ON while the underlay node has its transmitter 46 ON and its receiver 50 ON. Stage 232 is similar to stage 222 discussed above.

At stage 234, a determination is made that turning off the overlay node 15 is desired. For example, the UE 12 determines that the overlay node 15 is causing interference to the underlay cell 16 that the UE 12 is camping on. Also or alternatively, the UE 12 determines that the UE 12 will not need the overlay node 15, e.g., for a threshold amount of time, and that there is an underlay node 14 to provide service. In response to determining that the overlay node 15 can be turned OFF, the UE 12 sends an OFF request to the overlay node 15.

Stages 236 and 238 are similar to stages 176 and 178 discussed above. Therefore, a repetition of this operation is not provided here.

Figure 17:
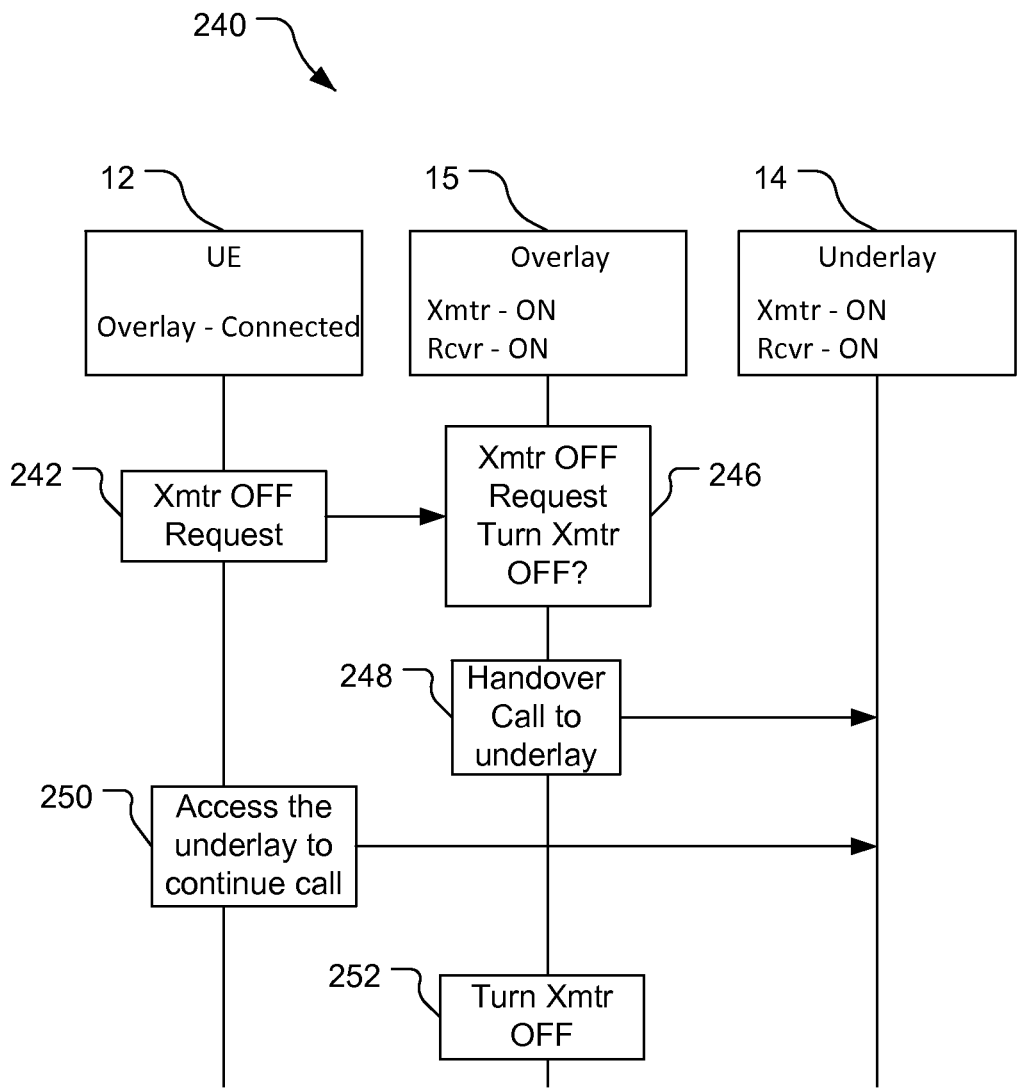
FIG. 17 is a block, swim-lane flow diagram of a process of an overlay-connected-mode UE initiating overlay cell turn OFF.

Referring to FIG. 17, with further reference to FIGS. 1-5, a process 240 includes stages by which a connected-mode UE on the overlay RAT initiates a cell turn OFF on the overlay RAT. The process 240 is, however, an example only and not limiting. At the outset of the process 240, the UE 12 is in connected mode with the overlay RAT. Further, the overlay node 15 has its transmitter 66 ON and its receiver 70 ON while the underlay node has its transmitter 46 ON and its receiver 50 ON.

At stage 242, the UE 12 determines to send a transmitter OFF request to the overlay node 15. The UE 12 may determine from signal measurements taken on the underlay RAT and/or the overlay RAT that it is desirable to have the overlay 15 turn its transmitter 66 OFF. For example, the UE 12 determines that the node 14 is underutilized, that the overlay node 15 is interfering with the underlay node 14, and/or that the node 14 could absorb the usage of the node 15, etc. In response to the determination, the UE 12 sends a dedicated request to the overlay node 15 to turn its transmitter 66 OFF.

At stage 246, once the overlay node 15 receives the turn OFF request and if similar messages were previously received from other UEs 12, the overlay node 15 might decide to turn OFF its transmitter 66. In that case, at stage 248, since the UE 12 is in connected mode on the overlay RAT, the overlay RAT can hand off the call to the underlay node 14. At stage 250, the UE 12 accesses the underlay node 14 to continue the handover call. After the handover process is completed, at stage 252 the overlay node 15 turns OFF its transmitter 66. If the overlay node 15 desires to send a turn OFF notification to the underlay node 14, then the mechanism described in stages 182 and 184 can be used in addition to stages 242, 246, 248, 250, 252.

Figure 18:
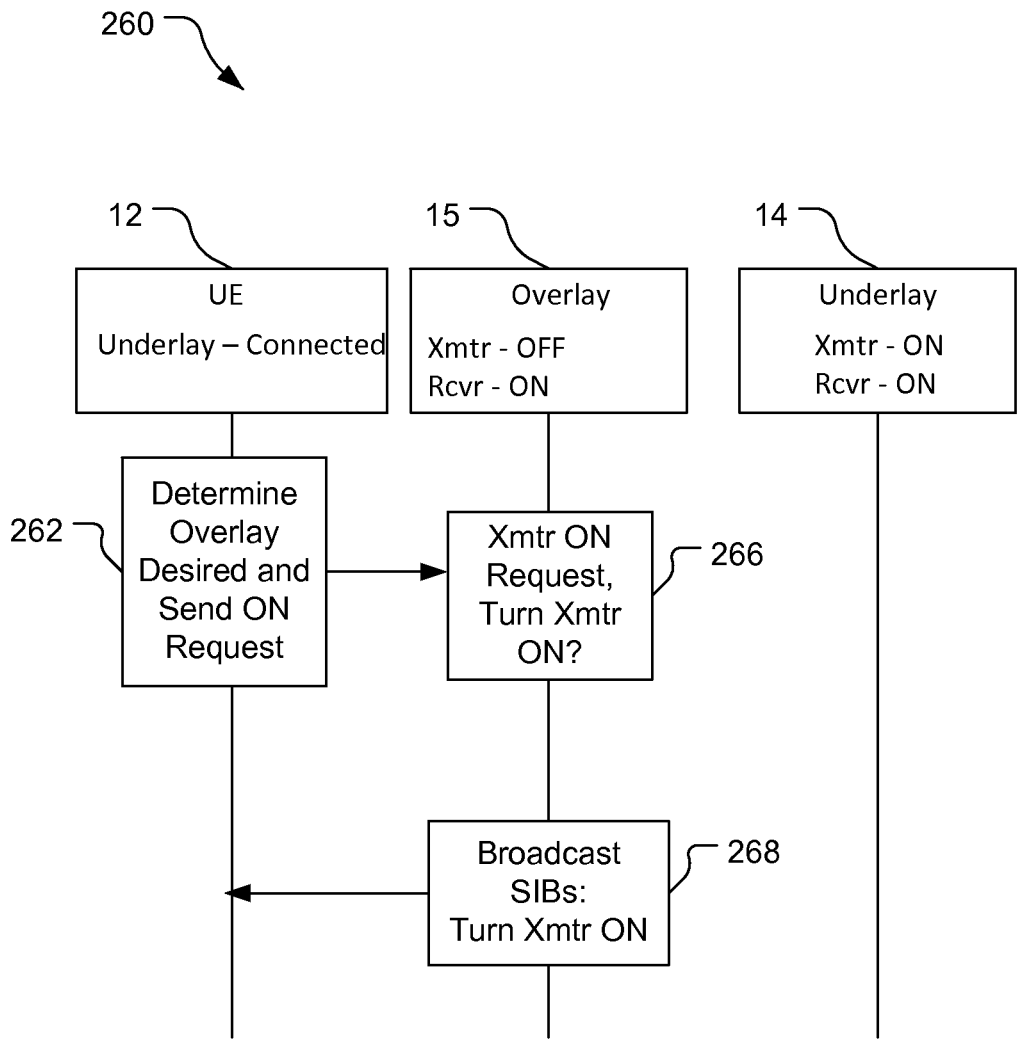

Referring to FIG. 18, with further reference to FIGS. 1-5, a process 260 includes stages by which a connected-mode UE 12 on the underlay node 14 initiates a cell turn ON on the overlay node 15. The process 260 is, however, an example only and not limiting. At the outset of the process 260, the UE 12 is in connected mode with the underlay RAT. Further, the overlay node 15 has its transmitter 66 OFF and its receiver 70 ON while the underlay node has its transmitter 46 ON and its receiver 50 ON.

At stage 262, the UE 12 determines that turning ON of the overlay node 15 is desirable. For example, the UE 12 may use knowledge of prior measurements taken when the overlay node transmitter 66 was previously ON to determine that having the transmitter 66 ON now would be useful. In response to the determination, the UE 12 releases the connection to the underlay node 14 and sends a request to the overlay node 15 to turn ON.

Stages 266 and 268 are similar to stages 166 and 168 discussed above. Therefore, a repetition of this operation is not provided here.

UE as a Relay for Network AQUISITION

The discussion above in the "UE As A Relay" section provides examples of implementation of ways that the UE 12 can be used as a relay between two RATs for power state status was presentation. Here, examples are provided for using the UE 12 for network acquisition assistance. Referring again to FIG. 1, with further reference to FIGS. 1-4, the system 10 may be used to reduce network acquisition and synchronization latency. For example, network acquisition and synchronization latency may be reduced compared to prior techniques used during reselection or handoff between from an underlay node 14 to an overlay node 15. As one example, when a UE 12 reselects or is handed off from an underlay 3G cell (e.g., a UTRAN or GERAN cell) to an overlay 4G cell (e.g., an E-UTRAN or LTE cell), there is significant latency and processing involved in the network acquisition and synchronization process due to measurements used to acquire the new network. This latency is even more pronounced when the 4G cell is in an idle, powered down, or discontinuous transmission (DTX) state because the UE will wait for the 4G cell to return to an active state in order to take measurements, e.g., of signaling information, of the 4G cell. The process of network acquisition and synchronization can be made more effective if the UE 12 has relevant system information such as timing and frequency information, scrambling codes and CELL identity (CELL_ID) readily available. This information can be made available if an underlay node 14 designates a UE 12 to acquire some aiding information from the overlay node 15 and report back to the underlay node 14. For example, the UE 12 may measure timing and frequency offset between the two RATs using conventional scrambling code acquisition and tracking techniques and report that information back to the underlay node 14. The underlay node 14 can forward that information to other UEs 12 within its own cell 16.

Figure 19:
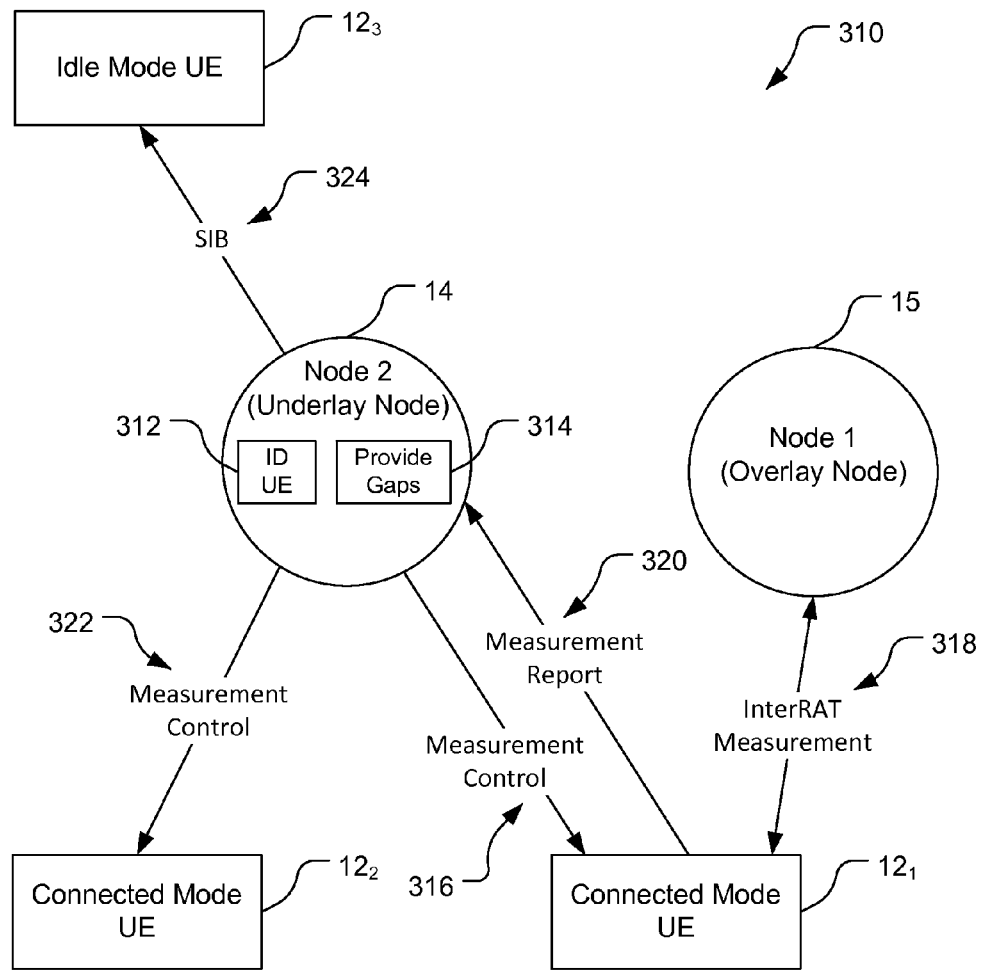
FIG. 19 is a block flow diagram of a process of reducing inter-network acquisition and synchronization latency for UEs accessing two different RATs.

Referring to FIG. 19, with further reference to FIGS. 1-5, a process 310 includes stages for reducing inter-network acquisition and synchronization latency by using a connected mode UE 12 on a second node, here the underlay node 14, to acquire system and synchronization information from a first node, here the overlay node 15, and relay this information back to the underlay node 14. The process 310 is, however, an example only and not limiting.

At stage 312, the underlay node 14 identifies connected mode UEs 12 that would be suitable as relays. For example, suitable UEs 12 could be UEs 12 with significant battery life and are able (have access) to take measurements on the overlay RAT while in connected mode on the underlay RAT. Suitable UEs 12 could be UEs 12 with a battery life sufficiently high to support obtaining the signaling information from the overlay node and sending the signaling information to the underlay node, e.g., without the battery life dropping below a threshold battery life level. The node 14 can identify a UE 12 as suitable by determining that the UE is able to obtain the signaling information while satisfying at least one criterion such as that a quality of service for the UE 12 will be maintained while obtaining the signaling information. Further, the node 14 identifies a suitable UE 12 as one that is currently capable of communicating with the node 15 and the node 14 (e.g., operational, within communication distance of the nodes 14, 15, etc.).

At stage 314, compressed mode gaps between transmissions from the underlay RAT node 14 toward UEs 12 connected to the underlay RAT node 14 are provided so that the UE 12 can interrupt transmission and reception on the underlay RAT and take measurements on the overlay RAT. If the overlay RAT is in DTX mode and its schedule is available to the underlay RAT, the compressed mode gaps from the underlay RAT node 14 can be aligned with DTX mode transmission times of the overlay RAT node 15. With the UE 12 in the compressed mode, the underlay node 14 provides information to the UE 12 with compressed data sent in intervals to the UE 12 with time gaps between the data transmission intervals. The UE 12 listens for the transmissions from the overlay node 15 during the compressed mode time gaps of the underlay node 14. The underlay node 14 aligns the time gaps with the DTX transmission times of the overlay node 15 such that the UE 12 can receive and process the information sent by the overlay node 15. If the DTX schedule of the overlay RAT is not available, the underlay node 14 can still provide compressed gaps for the UE 12 to take measurements. The compressed gaps, however, might not be aligned with the overlay RAT's wake-up period during the overlay node's DTX cycle so the UEs 12 might make several attempts before obtaining the system information. To help minimize the burden on a particular UE 12, the acquisition and relaying responsibility can be spread across multiple UEs 12 connected to the underlay RAT.

At stage 316, the underlay node 14 sends a request to the identified UE 12, here the UE 12$_1$, for the UE 12$_1$ to obtain signaling information from the overlay node 15. The underlay node 14 sends a measurement control signal to the UE 12$_1$ to measure or otherwise obtain the signaling information. The UE 12$_1$ is preferably configured to communicate using both the underlay RAT and the overlay RAT and may be currently on the underlay RAT but may transition to the overlay RAT in the near future.

At stage 318, the UE 12$_1$ performs inter-RAT measurement on the node 15. The UE 12$_1$ receives and decodes control channels transmitted by the overlay node 15 after a successful synchronization process to obtain signaling information, and provides the signaling information to the underlay RAT node 14. The UE 12 could obtain and provide cell specific signaling information such as timing and frequency information, scrambling codes, cell identity, a configured number of antennas, and/or channel bandwidth from the overlay node 15 to the underlay node 14. The signaling information may be obtained periodically, e.g., every few hours, to provide frequent timing updates and to account for clock drift.

At stage 320, the UE 12$_1$ sends the signaling information to the underlay node 14. The UE 12$_1$ sends the signaling information in a measurement report to the node 14.

At stages 322, 324, the signaling information is sent from the underlay RAT node 14 to one or more UEs 12 For example, at stage 322 the signaling information may be sent to the connected UEs 12, here the UE 12$_2$, using dedicated messages like the measurement control messages. As another example, at stage 324 the underlay node 14 may broadcast the signaling information to idle mode UEs 12, here the UE 12$_3$ in the underlay node's cell 16, for example, through SIB messages. The signaling information may include timing and frequency information, scrambling codes, cell IDs, etc.

Other Considerations

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, some configurations (including implementations) may employ a computer system to perform methods in accordance with various configurations of the invention. According to a set of configurations, some or all of the procedures of such methods are performed by the computer system in response to a processor executing one or more sequences of one or more instructions (which might be incorporated into the operating system of the computer system and/or other code, such as an application program) contained in working memory. Such instructions may be read into the working memory from another computer-readable medium, such as one or more storage device(s). Merely by way of example, execution of the sequences of instructions contained in the working memory might cause the processor(s) to perform one or more procedures of the methods described herein.

The terms "machine-readable medium" and "computer-readable medium," as used herein, refer to any medium that participates in providing data that causes a machine to operate in a specific fashion. A computer-readable medium may be a physical and/or tangible storage medium. Such a medium may take many forms, including but not limited to, non-volatile media, volatile media, and transmission media. Non-volatile media include, for example, optical and/or magnetic disks. Volatile media include, without limitation, dynamic memory. Transmission media include, without limitation, coaxial cables, copper wire and fiber optics. Hence, transmission media can also take the form of waves (including without limitation radio, acoustic and/or light waves, such as those generated during radio-wave and infrared data communications).

Physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to a processor for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system. These signals, which might be in the form of electromagnetic signals, acoustic signals, optical signals and/or the like, are all examples of carrier waves on which instructions can be encoded, in accordance with various configurations of the invention.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

Further, more than one invention may be disclosed.

What is claimed is:

1. A method of providing signaling for a wireless communication node, the method comprising:
   obtaining, at first user equipment (UE), first information associated with a first node of a first radio access technology (RAT) network that uses a first RAT, wherein the first information comprises at least one of the group consisting of synchronization information indicating a discontinuous transmission schedule of the first node and synchronization information indicating a discontinuous reception schedule of the first node, the first UE being configured for wireless telecommunication;
   sending, in response to obtaining the first information, second information from the first UE to a second node of a second RAT network that uses a second RAT, wherein the second information comprises at least one of the group consisting of an indication of a discontinuous transmission schedule of the first node and an indication of a discontinuous reception schedule of the first node, wherein the second RAT is different from the first RAT, and wherein the first and second node operate on a discontinuous transmission schedule, a discontinuous reception schedule, or both, and wherein the second information is sent to the second node by the first UE using the second RAT, without a backhaul connection between the first RAT and the second RAT being used; and
   wherein obtaining the first information comprises receiving a power status change request for the second node to turn on or off a transmitter of the second node, and wherein the power status change request for the second node is received from the first node in response to a trigger at the first node.

2. The method of claim 1 wherein obtaining the first information further comprises receiving the first node's power status notification to be communicated to the second node.

3. The method of claim 1 wherein obtaining the first information further comprises the UE measuring the first information.

4. The method of claim 1 wherein the second information is the first information.

5. The method of claim 1 wherein obtaining the first information further comprises at least one of taking a measurement with the first node or taking a measurement with the second node.

6. The method of claim 1 wherein the second information includes at least one of a power status change request for the second node, a power status notification of the first node for the second node, or synchronization information.

7. The method of claim 1 wherein the second information is signaling information configured to be used by a second UE to connect to the first node.

8. The method of claim 1 wherein the first information includes at least one of a power status change request for the second node, a power status notification of the first node for the second node, synchronization information, an indication of an undesirable signal quality between the first UE and the first node, or an indication of an undesirable service ability of the first node.

9. The method of claim 1 further comprising identifying the first UE as able to obtain the signaling information while satisfying at least one criterion.

10. The method of claim 9 wherein the identifying includes determining that a quality of service for the first UE will be maintained while obtaining the signaling information.

11. The method of claim 9 wherein the identifying includes determining that a battery life of the first UE is sufficiently high to support obtaining the signaling information and sending the signaling information to the second node.

12. The method of claim 11 wherein the identifying includes determining that the battery life of the first UE is sufficiently high to support obtaining the signaling information and sending the signaling information to the second node without the battery life dropping below a threshold battery life level.

13. The method of claim 9 wherein the identifying includes determining that the first UE is currently capable of communicating with the first node and the second node.

14. The method of claim 1 wherein obtaining the first information at the first UE further comprises obtaining a System Information Block (SIB) broadcast by the first node.

15. The method of claim 1 wherein obtaining the first information at the first UE further comprises receiving a dedicated message from the first node.

16. The method of claim 1 further comprising:
sending a transmitter on request to the second node; and
aligning compressed mode gaps of transmissions from the second node toward the first UE with DTX mode transmission times of the first node.

17. A user equipment (UE) comprising:
means for wireless communication;
means for obtaining first information associated with a first node of a first radio access technology (RAT) network that uses a first RAT, wherein the first information comprises at least one of the group consisting of synchronization information indicating a discontinuous transmission schedule of the first node and synchronization information indicating a discontinuous reception schedule of the first node;
means for sending, in response to obtaining the first information, second information, wherein the second information comprises at least one of the group consisting of an indication of a discontinuous transmission schedule of the first node and an indication of a discontinuous reception schedule of the first node, to a second node of a second RAT network that uses a second RAT that is different from the first RAT, wherein the first node includes a means for operating on a discontinuous transmission schedule, a discontinuous reception schedule, or both, and wherein the second information is sent to the second node by the UE using the second RAT, without a backhaul connection between the first RAT and the second RAT being used; and
wherein the means for obtaining the first information comprises means for receiving a power status change request for the second node to turn on or off a transmitter of the second node, and wherein the power status change request for the second node is received from the first node in response to a trigger at the first node.

18. The UE of claim 17 wherein the means for obtaining the first information further comprises means for receiving a power status notification of the first node.

19. The UE of claim 17 wherein the means for obtaining further comprises means for measuring the first information.

20. The UE of claim 17 wherein the second information is signaling information configured to be used by another UE to connect to the first node.

21. The UE of claim 17 wherein the second information includes at least one of a power status change request for the second node, a power status notification of the first node for the second node, or synchronization information.

22. The UE of claim 17 wherein the first information includes at least one of a power status change request for the second node, a power status notification of the first node for the second node, synchronization information, an indication of an undesirable signal quality between the UE and the first node, or an indication of an undesirable service ability of the first node.

23. The UE of claim 17 wherein the means for obtaining the first information are configured to obtain a System Information Block (SIB) broadcast by the first node.

24. A user equipment (UE) comprising:
a wireless communication module including receivers, transmitters, and antennas;
a memory storing processor-readable instructions; and
a processor coupled to the wireless communication module and the memory and configured to execute the instructions to:
obtain first information associated with a first node of a first radio access technology (RAT) network that uses a first RAT, wherein the first information comprises at least one of the group consisting of synchronization information indicating a discontinuous transmission schedule of the first node and synchronization information indicating a discontinuous reception schedule of the first node;
send second information, corresponding to the first information, to a second node of a second RAT network that uses a second RAT that is different from the first RAT, wherein the first node operates on a discontinuous transmission schedule, a discontinuous reception schedule, or both, and wherein the second information is sent to the second node by the UE using the second RAT, without a backhaul connection between the first RAT and the second RAT being used; and
wherein the processor is configured to obtain the first information by receiving a power status change request for the second node to turn on or off a transmitter of the second node, and wherein the power status change request for the second node is received from the first node in response to a trigger at the first node.

25. The UE of claim 24 wherein the wireless communication module is configured to receive the first information from the first node using a first RAT and to send the second information to the second node using the second RAT.

26. The UE of claim 25 wherein the processor is further configured to obtain the first information by obtaining a power status notification of the first node.

27. The UE of claim 24 wherein the second information is signaling information configured to be used by another UE to connect to the first node.

28. The UE of claim 24 wherein the second information includes at least one of a power status change request for the second node, a power status notification of the first node for the second node, or synchronization information.

29. The UE of claim 24 wherein the first information includes at least one of a power status change request for the second node, a power status notification of the first node for the second node, synchronization information, an indication of an undesirable signal quality between the UE and the first node, or an indication of an undesirable service ability of the first node.

30. A computer program product residing on a non-transitory processor-readable medium of user equipment (UE) and comprising instructions for causing a processor to:
obtain first information associated with a first node of a first radio access technology (RAT) network that uses a first RAT, wherein the first information comprises at least one of the group consisting of synchronization information indicating a discontinuous transmission schedule of the first node and synchronization information indicating a discontinuous reception schedule of the first node;
send second information, corresponding to the first information, to a second node of a second RAT network that uses a second RAT that is different from the first RAT, wherein the first node operates on a discontinuous transmission schedule, a discontinuous reception schedule, or both, and wherein the second information is sent to the second node by the UE using the second RAT, without a backhaul connection between the first RAT and the second RAT being used; and
wherein the instructions are configured to cause the processor to obtain the first information by receiving a power status change request for the second node to turn on or off a transmitter of the second node, and wherein the power status change request for the second node is received from the first node in response to a trigger at the first node.

31. The computer program product of claim 30 wherein the instructions are configured to cause the processor to receive the first information from the first node using a first RAT and to send the second information to the second node using the second RAT.

32. The computer program product of claim 30 wherein the instructions are further configured to cause the processor to obtain the first information by obtaining a power status notification of the first node.

33. The computer program product of claim 30 wherein the second information is signaling information configured to be used by another UE to connect to the first node.

34. The computer program product of claim 30 wherein the second information includes at least one of a power status change request for the second node, a power status notification of the first node for the second node, or synchronization information.

35. The computer program product of claim 30 wherein the first information includes at least one of a power status change request for the second node, a power status notification of the first node for the second node, synchronization information, an indication of an undesirable signal quality between the UE and the first node, or an indication of an undesirable service ability of the first node.

36. The method of claim 1, wherein the trigger includes determining that the first node is overloaded, receiving an indication that there are one or more UEs currently connected to the first node that require premium services that the first node does not support, or both.

* * * * *